US011938488B2

(12) United States Patent
Reznitchenko et al.

(10) Patent No.: US 11,938,488 B2
(45) Date of Patent: Mar. 26, 2024

(54) ROLLER CRUSHER AND METHOD FOR OPERATION THEREOF

(71) Applicant: Metso Outotec USA Inc., Waukesha, WI (US)

(72) Inventors: Vadim Reznitchenko, Mechanicsburg, PA (US); Keith Harbold, York, PA (US)

(73) Assignee: Metso Outotec USA Inc., Brookfield, WI (US)

( * ) Notice: Subject to any disclaimer, the term of this patent is extended or adjusted under 35 U.S.C. 154(b) by 120 days.

(21) Appl. No.: 17/546,215

(22) Filed: Dec. 9, 2021

(65) Prior Publication Data

US 2023/0182144 A1 Jun. 15, 2023

(51) Int. Cl.
*B02C 4/40* (2006.01)
*B02C 4/02* (2006.01)

(52) U.S. Cl.
CPC . *B02C 4/40* (2013.01); *B02C 4/02* (2013.01)

(58) Field of Classification Search
CPC .................................... B02C 4/02; B02C 4/40
See application file for complete search history.

(56) References Cited

U.S. PATENT DOCUMENTS 1,072,195 A * 9/1913 Quesada ................. B21B 28/04 72/236
2,111,535 A * 3/1938 Miller ....................... B02C 4/40 34/85
2,124,008 A * 7/1938 Roth .......................... B02C 4/40 15/88.1
2,560,837 A * 7/1951 Alciati ...................... B02C 4/32 241/222
2,969,193 A * 1/1961 Gillett ....................... B02C 4/40 241/222

(Continued)

FOREIGN PATENT DOCUMENTS

AU 2018264756 B1 9/2021
CN 104607268 A 5/2015

(Continued)

OTHER PUBLICATIONS

International Search Report and Written Opinion for PCT/US2022/049185, dated Mar. 21, 2023.

(Continued)

*Primary Examiner* — Faye Francis
(74) *Attorney, Agent, or Firm* — Andrus Intellectual Property Law, LLP

(57) ABSTRACT

A scraper device for a roller crusher, which scraper device includes a rotatable multi head scraper unit having at least two scrapers arranged tangentially about the rotatable multi head scraper unit at a respective radial distance from a rotational axis of the rotatable multi head scraper unit. The scraper device further includes a rotation actuator arranged to selectively rotate the rotatable multi head scraper unit to allow operative use of one of the at least two scrapers at a time. The scraper device further includes at least one brake arrangement configured to prevent and/or restrict rotation of the rotatable multi head scraper unit during operation of the one of the at least two scrapers. A roller crusher including the scraper device and a method for operating the roller crusher is also provided.

22 Claims, 11 Drawing Sheets

(56) References Cited

U.S. PATENT DOCUMENTS

| | | | | | |
|---|---|---|---|---|---|
| 2,991,019 | A * | 7/1961 | Sugden | B02C 4/40 241/222 |
| 3,255,285 | A * | 6/1966 | Chilson | B30B 11/16 264/109 |
| 4,134,673 | A * | 1/1979 | Fisher | G03G 21/0035 399/353 |
| 4,173,177 | A | 11/1979 | Davis | |
| 4,357,287 | A | 11/1982 | Schonert | |
| 4,434,522 | A | 3/1984 | Linzberger | |
| 4,906,335 | A | 3/1990 | Goodnow et al. | |
| 5,054,701 | A | 10/1991 | Durinck et al. | |
| 9,033,270 | B2 * | 5/2015 | Vantrease | B02C 4/40 241/166 |
| 11,618,034 | B2 * | 4/2023 | Mark | B02C 4/02 241/227 |

FOREIGN PATENT DOCUMENTS

| | | | | |
|---|---|---|---|---|
| CN | 106540776 | A | 3/2017 | |
| CN | 106733110 | A | 5/2017 | |
| CN | 106179585 | B | 8/2018 | |
| CN | 108855346 | A | 11/2018 | |
| CN | 109046576 | A | 12/2018 | |
| CN | 109174284 | A | 1/2019 | |
| CN | 106881169 | B | 8/2019 | |
| CN | 217140526 | U | 8/2022 | |
| DE | 102017208014 | A1 * | 11/2018 | B02C 4/283 |
| DE | 102019209514 | A1 | 12/2020 | |
| EP | 2653229 | A1 | 10/2013 | |

OTHER PUBLICATIONS

Wire wheel (from 2017) (https://www.amazon.com/dp/B08KDFHSVS, website accessed Apr. 12, 2023) (Year: 2017).

Office action for U.S. Appl. No. 17/197,346, dated Feb. 27, 2023.

International Search Report and Written Opinion for International Application No. PCT/US2022/019686 dated Jul. 14, 2022.

Final Rejection for U.S. Appl. No. 17/197,346, dated Sep. 7, 2023.

International Search Report and Written Opinion for International Application No. PCT/US2023/072881, dated Jan. 9, 2024.

* cited by examiner

ROLLER CRUSHER AND METHOD FOR OPERATION THEREOF

FIELD OF THE INVENTION

The present disclosure relates to a scraper device for a roller crusher, a roller crusher having two generally parallel rollers, wherein the roller crusher comprises a flange attached to at least one of the ends of one of the rollers, and a method for operating the roller crusher.

BACKGROUND

When crushing or grinding rock, ore, cement clinker and other hard materials, roller crushers may be used having two generally parallel rolls which rotate in opposite directions, and which are separated by a gap. The material to be crushed is then fed into the gap. One type of roller crusher is called high pressure grinding rollers or high pressure roller crushers. This type of comminution has been described in U.S. Pat. No. 4,357,287 where it was established that it is in fact not necessary to strive for single particle breakage when trying to achieve fine and/or very fine comminution of material. Quite opposite, it was found that by inducing compression forces so high that briquetting, or agglomeration of particles occurred during comminution, substantial energy savings and throughput increases may be achieved. This crushing technique is called interparticle crushing. Here, the material to be crushed or pulverized is crushed, not only by the crushing surfaces of the rolls, but also by particles in the material to be crushed, hence the name interparticle crushing. U.S. Pat. No. 4,357,287 specifies that such agglomeration may be achieved by using much higher compression forces then what was previously done. As an example, forces up to 200 kg/cm2 were previously used, whereas the solution in U.S. Pat. No. 4,357,287 suggests to use forces of at least 500 kg/cm2 and up to 1500 kg/cm2. In a roller crusher having a roller diameter of 1 meter, 1500 kg/cm2 would translate into a force of more than 200,000 kg per meter length of the rollers whereas previously known solutions could, and should, only achieve a fraction of these forces. Another property of the interparticle crushing is that a roller crusher should be choke fed with the material to be crushed, meaning that the gap between the two opposed rolls of the roller crusher should always be filled with material along the entire length thereof and there should also always be material filled to a certain height above the gap to keep it full at all times and to maintain a state of particle-on-particle compression. This will increase the output and the reduction to finer material. This stands in sharp contradiction to older solutions where it was always emphasized that single particle breaking was the only way fine and very fine particle comminution could be obtained.

Interparticle crushing, as opposed to some other types of crushing equipment, such as e.g. sizers, has the attribute that it does not create a series of shocks and very varying pressure during use. Instead, equipment using interparticle crushing is working with a very high, more or less constant pressure on the material present in the crushing zone created in and around the gap between the rolls.

In order to maintain crushing effect all along the length of the grinding rollers, flanges may be arranged to ends of the crushing rolls; one flange at each end of one roll, or one flange at one end of each roll, but on opposite ends of the roller crusher. With such an arrangement, it is possible to create a more efficient and uniform roll feed entry. The flanges will allow for material being fed such that a preferred material pressure is created over the entire length of the crusher rolls. It has been shown that it is possible to increase capacity of a given roller crusher with up to 20%, or sometimes even more, by using flanges. A general problem associated with grinding rollers without flanges is that the ratio between the roller diameter and the roller width is very important due to a significant edge effect, i.e. the crushing result is reduced at the edges of the rollers. This is because of the fact that material may escape over the edges of the rollers thereby reducing the crushing pressure on the material towards the gap at the edges of the rollers. Without flanges, it is thus necessary to recycle both material escaping the rolls and some of the material having passed the gap at the edges of the crusher rolls due to a lower pressure resulting in reduced breakage at the edges.

However, during operation of a grinding crusher with flanges, the flanges and also edges of opposite crusher roller is under a lot of stress and wear, and build-up material will gather in the transition between the crusher roller surface and the flange. Such excessive build-up material needs to be removed consistently during operation of the grinding crusher.

Prior art has suggested a scraper element for removing build-up material in the transition between the crusher roller surface and the flange, see for example AU 2018264756 or U.S. Pat. No. 5,054,701.

Proceeding therefrom, it is an object of the present disclosure to provide a scraper device, and a roller crusher comprising such scraper device with reduced maintenance time. A further object of the present disclosure is to provide a scraper device, and a roller crusher comprising such scraper device, with a simplified procedure for scraper replacement.

SUMMARY

According to a first aspect of the disclosure, this and other objects are achieved, in full or at least in part, by a scraper device for a roller crusher, which scraper device comprises a rotatable multi head scraper unit having at least two scrapers arranged tangentially about the rotatable multi head scraper unit at a respective radial distance from a rotational axis of the rotatable multi head scraper unit. The scraper device further comprises a rotation actuator arranged to selectively rotate the rotatable multi head scraper unit to allow operative use of one of the at least two scrapers at a time, and at least one brake arrangement configured to prevent and/or restrict rotation of the rotatable multi head scraper unit during operation of the one of the at least two scrapers.

One advantage of the scraper device disclosed is that such an arrangement enables a compact scraper arrangement, which reduces required space for assembling to a roller crusher. Another advantage is that it reduces maintenance time for exchange of a worn scraper, wherein a non-used, new scraper on the rotatable multi head scraper unit may be repositioned into operation position simply by rotating the rotatable multi head scraper unit, instead of having to perform a complete shutdown of the roller crusher for an exchange of scraper. A further advantage of the scraper device is that it allows for an easier replacement procedure once the scrapers needs to be replaced. The rotatable multi-head scraper unit may be prefabricated and pre-assembled, and the replacement procedure may therefore be limited to removing the old rotatable multi-head scraper unit, and attaching a new one in its place, thus effectively replacing two or more individual scrapers in one replacement operation.

A yet further advantage is that the rotatable multi-head scraper unit allows for a completely automated scraper exchange procedure. In contrast to prior art solutions, the rotation actuator may be actuated by a drive unit, such as e.g. an electrical motor, which drive unit may be controlled by a control system. Thus, the scraper device of the inventive concept allows for exchanging worn scrapers without manual intervention from an operator.

A yet further advantage of the scraper device is that the rotatable multi-head scraper unit allows for adjusting a distance between the scraper which performs a scraping operation, herein termed "operating scraper", and the envelope surface of the roller by adjusting the angular position of the rotatable multi-head scraper unit. This built-in adjustment ability of the scraper device may allow adjusting the thickness of the build-up material allowed to remain on the envelope surface of the roller. It may also remove the need to mount all scrapers to the rotatable multi head scraper to have exactly the same radial distance from the rotational axis. Furthermore, it may allow compensating for scraper wear, as will be detailed later.

The term "brake arrangement" as used herein should be construed broadly. The term is used here to represent any arrangement structured and arranged to prevent and/or restrict rotation of the rotatable multi head scraper unit during operation of the one of the at least two scrapers. The term "brake arrangement" therefore naturally encompasses typical brake systems such as friction brakes and clutches. However, the term "brake arrangement" must also be interpreted to encompass mechanical systems such as e.g. gear trains and any other mechanical linkage which, independent on if they are intended to perform additional tasks in the device, additionally are structured and arranged to prevent and/or restrict rotation of the rotatable multi head scraper unit during operation of the one of the at least two scrapers. A "brake arrangement" may be configured to prevent and/or restrict rotation of the rotatable multi head scraper unit to different degree. Some brake arrangements of the inventive concept may be configured to provide a counteracting moment on the rotatable multi head scraper unit which is strong enough to prevent an unwanted rotation thereof during normal operation, but still selected so as to allow the rotatable multi head scraper unit to rotate in a case where excessive material build-up impacts a scraper of the rotatable multi head scraper unit. This may be advantageous as it provides a means for the rotatable multi head scraper unit to be released from the operating position in a case where the impact force would be high enough to cause damage to the scraper device. That said, it is also conceivable that a "brake arrangement" of the inventive concept is configured to lock, by a locking engagement, the rotatable multi head scraper unit in the operating position thereof.

As readily appreciated by the person skilled in the art, the rotation of the rotatable multi head scraper unit is provided for repositioning the individual scrapers of the rotatable multi head scraper unit with respect to the roller surface. This implies that no rotation of the rotatable multi head scraper unit is performed during scraping operation. In other words, the scraper device is configured to prevent and/or restrict the rotatable multi head scraper unit from rotating so as to be stationary with respect to the roller crusher during crushing operation.

According to an embodiment of the scraper device, the rotatable multi head scraper unit is releasably arranged in the scraper device, to allow exchange of the rotatable multi head scraper unit. Such an exchange of the rotatable multi head scraper unit may for example be performed when all of the at least two scrapers have been worn down.

According to an embodiment of the scraper device, the rotatable multi head scraper unit comprises at least three, or at least four, or at least five scrapers arranged tangentially about the rotatable multi head scraper unit at a respective radial distance from the rotational axis. As readily appreciated by the person skilled in the art, a larger number of scrapers on the rotatable multi head scraper unit will prolong the operation time of the scraper device before having to replace the rotatable multi head scraper unit after all scrapers having been worn down. The maximum number of scrapers arranged on the rotatable multi head scraper unit depends on a radial extension of the rotatable multi head scraper unit. Thus, the larger radial extension of the rotatable multi head scraper, the larger number of scrapers may be arranged on the rotatable multi head scraper unit. The size thereof is design in relation to the roller crusher to which is intended to be used in and the available space at the end of a roller having a flange.

According to an embodiment of the scraper device, a first-in-line scraper and a last-in-line scraper are positioned such that these are separated with an angle of at least 120 degree upstream of the first-in-line scraper.

The phrasing "first-in-line scraper" means the scraper which is arranged on the rotatable multi head scraper unit to be used first of the at least two scrapers in operation when a scraper device has been installed into the roller crusher, or when a new rotatable multi head scraper unit has been arranged on the scraper device. It should be understood that the term is not necessarily used to distinguish a particular scraper of the at least two scrapers on a rotatable multi head scraper unit. The first-in-line scraper may be any one of the at least two scrapers. Instead, the first-in-line scraper will be the one scraper which is first out to perform scraping operation. For some embodiments of the rotatable multi head scraper unit, the at least two scrapers may be positioned such that one scraper will be a natural first-in-line scraper. This is applicable for rotatable multi head scraper units where the at least two scrapers are nonuniformly distributed over the rotatable multi head scraper unit.

The phrasing "last-in-line scraper" means the scraper which is arranged on the rotatable multi head scraper unit to be used last of the at least two scrapers in operation when a scraper device has been installed into the roller crusher, or when a new rotatable multi head scraper unit has been arranged on the scraper device. Thus, the second-in-line scraper is a last-in-line scraper when two scrapers are arranged on the rotatable multi head scraper unit, or the third-in-line scraper is the last-in-line scraper when three scrapers are arranged on the rotatable multi head scraper unit, or the fourth-in-line scraper is the last-in-line scraper when four scrapers are arranged on the rotatable multi head scraper unit, and so forth.

The phrasing "upstream of the first-in-line scraper" means an area in front of a scraping surface of the first-in-line scraper, which scraping surface will encounter any build-up material when a roller of the roller crusher rotates during operation of the roller crusher. Thus, the "stream" in this case would correspond to the build-up material at the flange which typically extends annularly around the roller surface of the roller at the flange and which therefore, often continuously, impinges as a "stream" of material on the scraper surface during crushing operation. However, as readily appreciated by the person skilled in the art, the term "upstream" is used here to define a direction only, and the wording should therefore not be construed as limiting the material distribution at the flange in any particular way.

One advantage with such an arrangement is that any build-up material being scraped off by the first-in-line scraper will have little or no impact with a backside surface of the last-in-line scraper. This may be beneficial as it reduces the wear of the scrapers and hence prolongs the life of the scraper device.

According to one embodiment of the scraper device, a wear protective liner is arranged on a backside surface of the last-in-line scraper.

One advantage with such an arrangement is that should any build-up material being scraped off by the first-in-line scraper have impact on a backside surface of the last-in-line scraper, such a wear protective liner will protect the last-in-line scraper from being damaged before being used during operation.

According to one embodiment of the scraper device, the first-in-line scraper and the last-in-line scraper are positioned such that these are separated with an angle of at least 140 degree upstream of the first-in-line scraper.

According to one embodiment of the scraper device, the first-in-line scraper and the last-in-line scraper are positioned such that these are separated with an angle of at least 160 degree upstream of the first-in-line scraper.

According to one embodiment of the scraper device, the first-in-line scraper and the last-in-line scraper are positioned such that these are separated with an angle of at least 180 degree upstream of the first-in-line scraper.

One advantage with such an arrangement is that the scraper device may be arranged in relation to the roller crusher such that build-up material being scraped off by the first-in-line scraper will have no or low impact on a backside surface of the last-in-line scraper as the build-up material being scraped off will pass the rotatable multi head scraper unit at an area where no scrapers are arranged tangentially at radial distance from the rotational axis of the rotatable multi head scraper unit. Further, when the first-in-line scraper has been worn out, a second-in-line scraper will be rotated in position for operation. In operation of the second-in-line scraper build-up material being scraped off will have an impact on a backside surface of a first-in-line scraper, but as it has already worn out, it will need to be replaced anyhow, so it does not matter that a backside surface thereof is worn when a second-in-line scraper is in operation. Further, when a second-in-line scraper has been worn out, a possible third-in-line scraper will be rotated in position for operation. In operation of the possible third-in-line scraper, build-up material being scraped off will have an impact on a backside surface of the second-in-line scraper, but as it has already been worn out, it will need to be replaced anyhow, so it does not matter that a backside surface thereof is worn when a possible third-in-line scraper is in operation. The same is true for a possible fourth-in-line or a possible fifth-in-line scraper should these number of scrapers be arranged on the rotatable multi head scraper unit as the at least two scrapers.

Typically, the at least two scrapers are arranged at the same radial distance from a rotational axis of the rotatable multi head scraper unit. In other words, the respective radial distances may be equal to each other. However, it is also conceivable that at least one scraper of the at least two scrapers is arranged at a radial distance different from the radial distance at which the other one(s) of the at least two scrapers are arranged. It is also conceivable that the at least two scrapers are arranged at mutually different radial distances from the rotational axis of the rotatable multi head scraper unit.

The purpose of providing different distances may be to allow a convenient way of selecting the degree of scraping. For example, there may be situations where build-up material may be tolerated to a higher degree than in other situations. This may for example be when the roller crusher is operated with a relatively large crushing gap. In such situations, the rotatable multi head scraper unit may be rotated to exchange a scraper being located close to the roller with another scraper located further away from the roller.

According to one embodiment, the scraper device may further comprise a shaft member having a first and a second end and being rotatably arranged, wherein the rotatable multi head scraper unit is attached to the first end of the shaft member, and wherein the rotation actuator is arranged at the second end of the shaft member.

This may be advantageous as it allows controlling the rotatable multi head scraper unit from a distance. This may be especially beneficial on a roller crusher where the rotatable multi head scraper unit must be disposed at a flange region of a roller, a region which is not always easily accessible from the outside. The shaft member may for example be arranged to protrude through a wall or structure of the roller crusher such that the rotatable multi head scraper unit is disposed on a first side of the wall/structure, and the rotation actuator is arranged on the other side of the wall/structure.

The rotatable multi head scraper unit may be releasably attached to the shaft member. This may be achieved in many alternative ways. For example, the rotatable multi head scraper unit may be releasably attached to the shaft member by means of a releasable fastening device such as e.g. a flange connection or a bushing. The bushing may be e.g. a tapered bushing, an XT bushing, or a QD bushing.

According to one embodiment, the scraper device further comprises a support arrangement arranged to at least partially encircle the shaft member and further arranged to be connected to a frame of the roller crusher. This implies that the rotatable multi head scraper unit may be supported by the shaft member which in turn is supported by the support arrangement. This may be advantageous as it allows replacing the rotatable multi head scraper unit without having to interact with the support arrangement.

As readily appreciated by the person skilled in the art, it is not essential that the support arrangement completely encircles the shaft member. As a non-limiting example only, the shaft member may be supported by two concave elements which engages the shaft member from opposite directions.

According to one embodiment, a first brake arrangement of the at least one brake arrangement is supported by the support arrangement, and wherein the first brake arrangement comprises a friction element configured to selectively engage the shaft member, or an engagement element attached thereto, to thereby prevent and/or restrict a rotation of the rotatable multi head scraper unit.

The friction element may be elastomeric. The friction element may be made from rubber or polyurethane. Alternatively, the friction element may be attached to a further element which is elastomeric. The further element may be made from rubber or polyurethane. The use of an elastomeric element may be advantageous as it allows providing a more uniform pressure exertion on the shaft member or the engagement element in response to the elastomeric element being exposed to an external force.

According to one embodiment, the friction element is elastomeric or is attached to a supporting element which is elastomeric, and wherein the first brake arrangement further comprises a supporting structure structured and arranged to at least partially enclose the friction element or the supporting element.

This may be advantageous as it allows initiating an engagement with the shaft member or the engagement element by exposing the elastomeric friction element or elastomeric supporting element to a compression force having an arbitrary direction in relation to the shaft. This technical effect occurs since the elastomeric friction element will, as a result from its elastic properties, exert a pressure on the shaft member or the engagement element in response to any attempt to compress the elastomeric friction member or the elastomeric supporting member within the supporting structure. Thus, it is not required to provide a compression force onto the elastomeric element which is substantially parallel to the direction at which the elastomeric element engages the shaft member or engaging element. As long as the elastomeric element is compressed, it will expand in the direction towards the shaft member or the engaging element and thereby exert pressure thereto.

According to one embodiment, the rotation actuator comprises a gear box.

The phrasing "gear box" means a part of a transmission system which comprises a gear train including at least one drive gear to which a torque is provided, and one driven gear, which is mechanically coupled to the drive gear and which delivers torque from the gear box. A simple gear box may consist of only the drive gear and the driven gear. In such a gear box, the drive gear engages the driven gear directly. A gear box may optionally comprise one or more further intermediary gears, also termed idler gears, which interconnects the drive gear with the driven gear so as to provide a mechanical linkage between the drive gear and the driven gear. Any kind of gears are conceivable for a gear box according to the disclosure. Such gears include spur gears, bevel gears, worm gears etc.

The provision of a gear box may be advantageous as it allows for providing a suitable gear ratio for selectively rotating the rotatable multi head scraper unit. It is conceivable that many embodiments of the scraper device as disclosed herein will require a significant torque to be provided in order to rotate the rotatable multi head scraper unit. By the provision of a gear box, it may be possible to maneuver the rotatable multi head scraper unit manually by hand, for example by means of a maneuvering wheel or crank. Another advantage of the gear box may be that it allows providing the torque in a direction which is non-parallel with the rotational axis of the rotatable multi head scraper unit. This may be achieved by the gear box including gear arrangements such as worm drives, hypoid gears, crossed helical gears, or the like.

According to one embodiment, the gear box is configured to act as a second brake arrangement of the at least one brake arrangement.

As previously mentioned with reference to the first aspect, a brake arrangement of the disclosure must not be limited to what is conventionally referred to as a brake. Rather, the term brake arrangement should be construed as encompassing all devices configured to prevent and/or restrict rotation. As readily appreciated by the person skilled in the art, a gear box will always have a degree of frictional resistance, which will provide a degree of brake power to the mechanical system to which the gear box is engaged. The brake power will increase with increasing frictional forces within the gear train.

According to one embodiment, the gear box comprises a gear train having a gear ratio larger than 1. Alternatively, the gear train may have a gear ratio larger than 10, or larger than 20 or larger than 40.

The gear ratio of the gear train is defined as the ratio between the number of rotations of the drive gear and the number of rotations of the driven gear. This implies that a gear ratio larger than 1 will allow a larger number of revolutions caused by applying a lower torque to the drive gear to be transformed into a lower number of revolutions with a higher torque on the driven gear.

A gear box having a gear train with a gear ratio larger than 1 may be beneficial for several reasons. Firstly, as previously mentioned, it provides a means for transforming a low-torque rotation to a high torque rotation. This may be advantageous as it allows to maneuver the rotatable multi head scraper unit manually by hand, for example by means of a maneuvering wheel or crank. Furthermore, the gear ration will also affect the level of brake power that the gear box may provide to the rotatable multi head scraper unit. Specifically, the brake power will increase with increasing gear ratio of the gear train.

According to one embodiment, a third brake arrangement of the at least one brake arrangement is a ratchet arrangement.

The ratchet arrangement is configured to prevent rotational movement in one rotational direction and allow rotational movement in the opposite rotational direction. A ratchet arrangement may comprise a ratchet wheel in the form of a toothed gear having uniform but asymmetrical teeth, with each tooth having a moderate slope on one edge and a much steeper slope on the other edge. The ratchet arrangement may further comprise a pivoting, often spring-loaded finger sometimes termed pawl, which engages the teeth. When the teeth are moving in the unrestricted (i.e. forward) direction, the pawl easily slides up and over the gently sloped edges of the teeth, with a spring forcing it into the depression between the teeth as it passes the tip of each tooth. When the teeth move in the opposite (backward) direction, however, the pawl will catch against the steeply sloped edge of the first tooth it encounters, thereby locking it against the tooth and preventing any further motion in that direction.

The ratchet arrangement may be advantageous as it serves to restrict movement to only one rotational direction, which allows for better control of the scraper device. The ratchet arrangement may be configured to prevent rotation in a rotational direction opposite to the rotational direction of the roller having a flange. This may be advantageous as it may prevent the one of the at least two scrapers from being forced backwards in response to an impact from build-up material at the flange. It is however conceivable that a release mechanism is available for cases where the impact force exceeds a maximum allowable impact force. Therefore, the ratchet arrangement may comprise a torque limiter configured to disable the ratchet mechanism so as to allow rotational movement along both rotational directions.

According to one embodiment, the scraper device comprises two rotatable multi head scraper units arranged at opposite ends of a roller having two flanges attached to the opposite ends, each rotatable multi head scraper unit having at least two scrapers arranged tangentially about the rotatable multi head scraper unit at a respective radial distance from a rotational axis of the rotatable multi head scraper unit, and wherein the rotation actuator is arranged to selectively rotate both rotatable multi head scraper units together.

This may be advantageous as it would allow controlling dual scrapers using one single actuator mechanism.

According to one embodiment, the scraper device further comprises a drive unit arranged to provide kinetic energy to the rotation actuator for the selectively rotation of the rotatable multi head scraper unit.

This may be advantageous as it allows for remotely controlling scraper exchange.

According to one embodiment, the scraper device has rotary indexing capability for selectively rotating the rotatable multi head scraper unit between predefined angular positions.

The rotary indexing capability may be advantageous as it facilitates selection of appropriate operating positions. The rotary indexing capability may for example be beneficial when exchanging the operating scraper, which is achieved by rotating the rotatable multi head scraper unit such that the one of the at least two scrapers is exchanged with another one of the at least two scrapers at the end of the roller having a flange. The rotary indexing capability may also be beneficial when adjusting the position of the operating scraper without exchanging it. The multi head scraper unit may be rotated such that the operating scraper is moved from a first operating position to a second operating position, which operating positions has different distances to the envelope surface. The rotary indexing capability may be used to define a plurality of predetermined operating positions for the operating scraper, each operating position corresponding to an associated predefined angular position of the rotatable multi head scraper unit.

The rotary indexing capability may be realised by an integrated motion system. Such integrated motion systems may typically comprise motors and mechanical power transmission devices along with encoders, sensors and controllers. Thus, the scraper device may further comprise at least one sensor for determining the angular position of the rotatable multi head scraper unit and/or the position of one or more of the at least one scraper. The scraper device may further comprise at least one drive unit for rotating the rotatable multi head scraper unit. The scraper device may further comprise at least one control unit for rotating the rotatable multi head scraper unit.

According to a second aspect of the disclosure, this and other objects are achieved, in full or at least in part, by a roller crusher having two generally parallel rollers arranged to rotate in opposite directions, and separated by a gap, each roller having two ends, the roller crusher comprising: a flange attached to one of the ends of one of the rollers, the flange extending in a radial direction of the roller, and the flange having an extension (E) past an envelope surface of the roller. The roller crusher further comprises a scraper device as disclosed in the first aspect of this disclosure, wherein the rotatable multi head scraper unit is arranged such that one of the at least two scrapers, by the rotation actuator, is selectively positionable at an end of a roller having a flange, and, by the at least one brake arrangement, is prevented and/or restricted to move relative to the roller to thereby at least partially allow removal of material accumulated on the flange and/or on the envelope surface at an end portion of the roller adjacent the flange.

According to one embodiment of the second aspect, the roller crusher comprises two flanges attached to opposite ends of one of the rollers, and wherein a scraper device according to the first aspect is arranged at each ends of the roller with the flanges.

According to one embodiment of the second aspect, the roller crusher comprises two flanges attached to opposite ends of one of the rollers, and a scraper device comprising two rotatable multi head scraper units, each rotatable multi head scraper unit having at least two scrapers arranged tangentially about the rotatable multi head scraper unit at a respective radial distance from a rotational axis of the rotatable multi head scraper unit, and wherein the rotation actuator is arranged to selectively rotate both rotatable multi head scraper units together, and wherein the scraper device is arranged such that the two rotatable multi head scraper units are arranged at opposite ends of the roller having two flanges attached to the opposite ends.

According to one embodiment of the second aspect, the roller crusher further comprises a sensor system for monitoring the condition of the scraper device, and a controller operatively connected to the sensor system and to the drive unit.

This is advantageous as it allows to automatically determine when there is a need for exchanging a worn-out scraper. It is contemplated that this exchange operation is available during operation of the roller crusher, hence removing a need for a roller crusher shut down. Moreover, the sensor system may allow for an improved prediction as to when the roller crusher has to be shut down for a replacement of a completely worn out rotatable multi head scraper unit. For example, the sensor system may be configured to determine how many scrapers of the at least two scrapers are still available for scraping.

The second aspect is generally associated with the same advantages as the first aspect. Moreover, the embodiments disclosed for the first aspect are equally well applicable for the second aspect.

According to a third aspect of the disclosure, this and other objects are achieved, in full or at least in part, by a method for operating a roller crusher for grinding granular material, wherein the roller crusher has two generally parallel rollers arranged to rotate in opposite directions, and separated by a gap, each roller having two ends, the roller crusher comprising: a flange attached to one of the ends of one of the rollers, the flange extending in a radial direction of the roller, and the flange having an extension (E) past an envelope surface of the roller, wherein the roller crusher further comprises a scraper device as disclosed in the first aspect of this disclosure, wherein the rotatable multi head scraper unit is arranged such that one of the at least two scrapers, by the rotation actuator, is selectively positionable at an end of a roller having a flange, and, by the at least one brake arrangement, is prevented and/or restricted to move relative to the roller; wherein the method comprises at least the step of at least partially removing material accumulated on the flange and/or on the envelope surface at an end portion of the roller adjacent the flange by means of the one of the at least two scrapers.

According to one embodiment of the third aspect, the method further comprises the step of rotating the rotatable multi head scraper unit such that the one of the at least two scrapers is exchanged with another one of the at least two scrapers at the end of the roller having a flange.

According to one embodiment of the third aspect, the method further comprises the step of rotating the rotatable multi head scraper unit such that the one of the at least two scrapers is moved from a first operating position to a second operating position, wherein a distance between the one of the at least two scrapers and the envelope surface as defined in an un-worn state of the one of the at least two scrapers is larger at the first operating position than at the second operating position.

Scrapers will be exposed to wear during scraping operation. Therefore, the radial extension of the scraper, i.e. the radial distance from the rotational axis of the rotatable multi-head scraper unit, will gradually crease during the life of the scraper. This will result in the build-up material at the flange to be gradually thicker with time. In other words, even if the operating scraper is always performing an efficient scraping of the enveloped surface, the scraping operation as such will not be consistent in time. By adjusting the angular position of the rotatable multi-head scraper unit, the operating scraper may be moved to a position which is closer to the enveloped surface, thereby compensating for the effect of wear on the radial extension of the scraper.

The scraper device may preferably have rotary indexing capability for selectively rotating the rotatable multi-head scraper unit between predefined angular positions. The rotary indexing capability may be advantageous as it facilitates selection of appropriate operating positions. Specifically, the rotatable multi-head scraper unit may be rotated such that the operating scraper is moved from a first operating position to a second operating position, which operating positions has different distances to the envelope surface. The rotary indexing capability may be used to define a plurality of predetermined operating positions for the operating scraper, each operating position corresponding to an associated predefined angular position of the rotatable multi head scraper unit.

According to one embodiment of the third aspect, the scraper device further comprises a drive unit arranged to provide kinetic energy to the rotation actuator for the selective rotation of the rotatable multi head scraper unit, and wherein the method further comprises rotating the rotatable multi head scraper unit by means of the drive unit.

This may be advantageous as it removes a need for a manual exchange of scrapers at the roller crusher. Apart from the benefit of reducing manual labour, it allows for initiating a scraper exchange from a distance.

According to one embodiment of the third aspect, the roller crusher further comprises a sensor system for monitoring the condition of the scraper device; and a controller operatively connected to the sensor system and to the drive unit, and wherein the method further comprises the control unit controlling the rotation of the rotatable multi head scraper unit based on output data from the sensor system.

This may be advantageous as it allows to automatically determine when there is a need for exchanging a worn-out scraper or when there is a need to move the one of the at least two scrapers from a first operating position to a second operation position. It is contemplated that this exchange or movement operation is available during operation of the roller crusher, hence removing a need for a roller crusher shut down. Moreover, the sensor system may allow for an improved prediction as to when the roller crusher has to be shut down for a replacement of a completely worn out rotatable multi head scraper unit. For example, the sensor system may be configured to determine how many scrapers of the at least two scrapers are still available for scraping.

The third aspect are generally associated with the same advantages as the first and second aspect. Moreover, the embodiments disclosed for the first aspect are equally well applicable for the third aspect.

Other objectives, features and advantages of the present disclosure will appear from the following detailed disclosure, from the attached claims, as well as from the drawings. It is noted that the disclosure relates to all possible combinations of features.

Generally, all terms used in the claims are to be interpreted according to their ordinary meaning in the technical field, unless explicitly defined otherwise herein. All references to "a/an/the [element, device, component, means, step, etc.]" are to be interpreted openly as referring to at least one instance of said element, device, component, means, step, etc., unless explicitly stated otherwise. The steps of any method disclosed herein do not have to be performed in the exact order disclosed, unless explicitly stated.

As used herein, the term "comprising" and variations of that term are not intended to exclude other additives, components, integers or steps.

BRIEF DESCRIPTION OF THE DRAWINGS

The disclosure will be described in more detail with reference to the appended schematic drawings, which show an example of a presently preferred embodiment of the disclosure.

DETAILED DESCRIPTION

Figure 1:
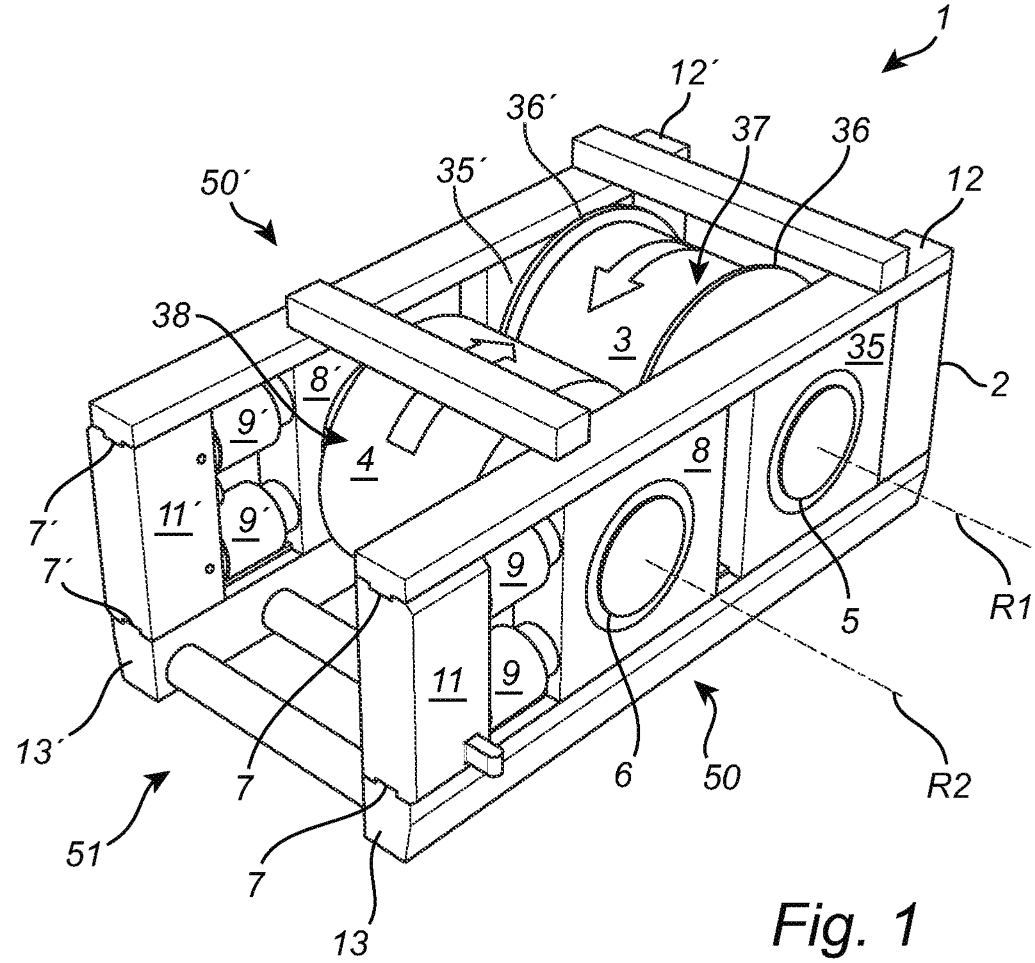
Fig. 1 PRIOR ART
FIG. 1 is a perspective view of a roller crusher according to prior art.

The present disclosure will now be described more fully hereinafter with reference to the accompanying drawings, in which currently preferred embodiments of the disclosure are shown. The present disclosure may, however, be embodied in many different forms and should not be construed as limited to the embodiments set forth herein; rather, these embodiments are provided for thoroughness and completeness, and to fully convey the scope of the disclosure to the skilled addressee. Like reference characters refer to like elements throughout.

Figure 2A:
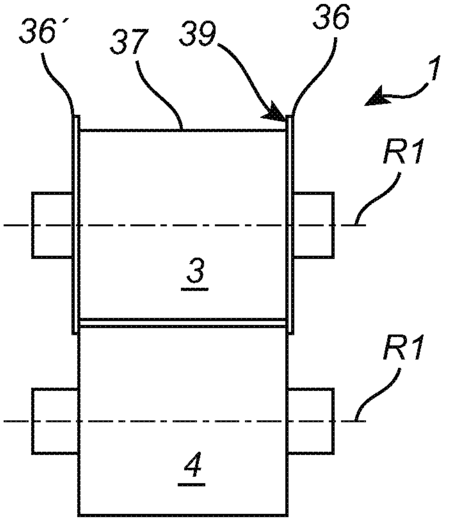
Fig. 2A PRIOR ART
FIG. 2A is a schematic top view of two rollers of the roller crusher of FIG. 1.
Figure 2B:
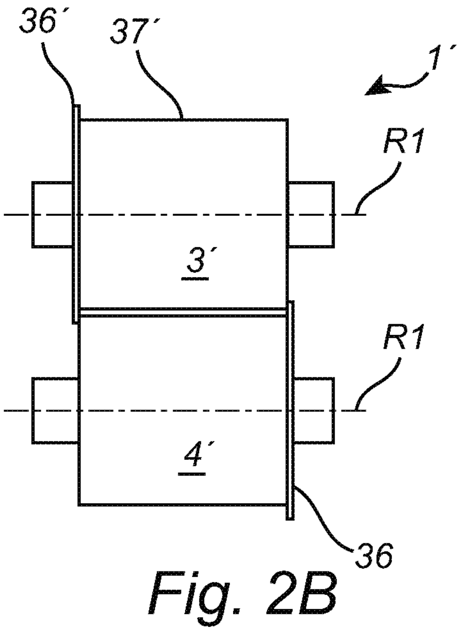
Fig. 2B PRIOR ART
FIG. 2B is a schematic top view of two rollers of a roller crusher of the prior art according to an alternative embodiment.

As discussed in the background part of this disclosure, the arrangement of flanges to the ends of the crushing rollers (as shown in FIG. 2A and further discussed below), either one flange in each end of one of the grinding rollers (as shown in FIG. 2A and further discussed below), or one flange on each grinding roller (as shown in FIG. 2B and further discussed below), the crushing effect along the length of the grinding rollers are maintained. However, these flanges and also the edges of opposite grinding roller are under a lot of stress and wear during operation of the roller crusher due to accumulation of grinded material in the transition between the flange and an envelope surface of the grinding roller. Prior art has suggested a scraper element for removing this accumulation of material, but an object of the present disclosure is to proceed from there and provide a scraper device with reduced maintenance time and with a simplified procedure for scraper position adjustment and replacement.

With reference to FIGS. 4, 5, 8A-B, 9A-B, and 10, this is achieved, in full or at least in part by a scraper device 200, 200', 300 and a roller crusher 1 comprising such a scraper device 200, 200', 300, which scraper device 200, 200', 300 comprises a rotatable multi head scraper unit 210, 210', 310*a*, 310*b* having at least two scrapers 100 arranged tangentially about the rotatable multi head scraper unit 210, 210', 310*a*, 310*b* at a respective radial distance T from a rotational axis A of the rotatable multi head scraper unit 210, 210', 310*a*, 310*b*. The scraper device 200, 200', 300 further comprises a rotation actuator 202 arranged to selectively rotate the rotatable multi head scraper unit 210, 210', 310*a*, 310*b* to allow operative use of one of the at least two scrapers 100 at a time, and at least one brake arrangement B1, B2, B3 configured to prevent and/or restrict rotation of the rotatable multi head scraper unit 210, 210', 310*a*, 310*b* during operation of the one of the at least two scrapers 100.

The scraper device 200, 200' of the present disclosure provides a number of advantages, such as enabling a compact scraper arrangement, reducing maintenance time for exchange of a worn scraper, allowing for an easier replacement procedure once the scrapers needs to be replaced, allowing for a completely automated scraper exchange procedure, and allowing for adjusting a distance between the scraper which performs a scraping operation, herein termed "operating scraper", and the envelope surface of the roller by adjusting the angular position of the rotatable multi-head scraper unit.

FIG. 1 shows a roller crusher 1 according to the prior art. Such roller crusher 1 comprises a frame 2 in which a first, fixed crusher roller 3 is arranged in bearings 5, 5'. The bearing housings 35, 35' of these bearings 5, 5' are fixedly attached to the frame 2 and are thus immoveable. A second crusher roller 4 is arranged in the frame 2 in bearings 6, 6' which are arranged in the frame 2 in a slidable moveable manner. The bearings 6, 6' can move in the frame 2 in a direction perpendicular to a longitudinal direction of the first and second crusher rollers 3, 4. Typically a guiding structure 7, 7' is arranged in the frame on first and second sides 50, 50' along upper and lower longitudinal frame elements 12, 12', 13, 13' of the roller crusher 1. The bearings 6, 6' are arranged in moveable bearing housings 8, 8' which can slide along the guiding structure 7, 7'. Further, a number of hydraulic cylinders 9, 9' are arranged between the moveable bearing housing 8, 8' and first and second end supports 11, 11' which are arranged near or at a first end 51 of the roller crusher 1. These end supports 11, 11' attach the upper and lower longitudinal frame elements 12, 12', 13, 13' and also act as support for the forces occurring at the hydraulic cylinders 9, 9' as these are adjusting the gap width and reacting to forces occurring at the grinding rollers 3, 4 due to material fed to the roller crusher 1.

Such roller crushers work according to a technique called interparticle crushing. The crushing rollers 3, 4 rotates counter to each other as illustrated schematically in FIG. 1 using the arrows. The gap between the crushing rollers 3, 4 is adjusted by the interaction of feed load and the hydraulic system effecting the position of the second crusher roller 4. As shown in FIG. 1 and also in FIG. 2A which shows the rollers 3, 4 from above, one of the grinding rollers 3 further comprises flanges 36, 36' arranged at opposite ends of the grinding roller 3, wherein each flange 36, 36' has an extension E past an envelope surface 37 of the roller body of the roller 3 (see FIG. 3A), and positioned axially outward of the roller body of the opposite grinding roller 4.

Another prior art roller crusher is disclosed in e.g. WO2013/156968, in which each of the grinding rollers with bearings is arranged in interconnected arch-shaped frame sections, wherein each interconnected arch shaped frame sections are pivotably connected to a base frame. The disclosed subject matter within this disclosure is equally applicable in such a prior art roller crusher arrangement.

Figure 3A:
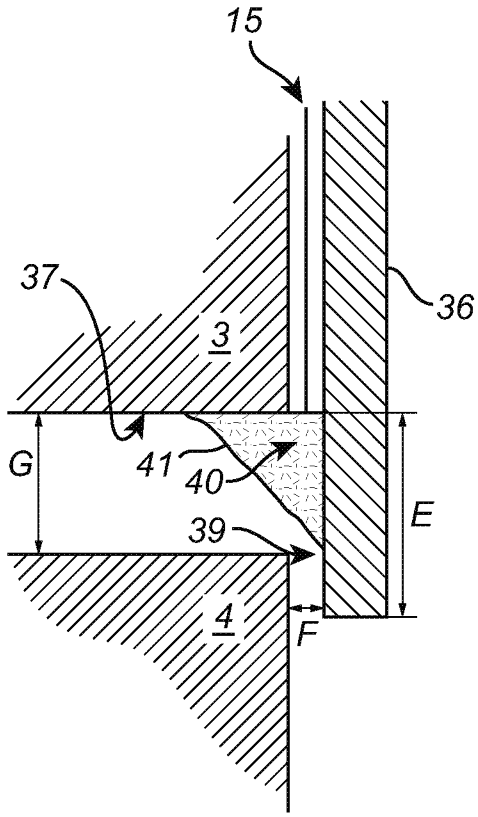
Fig. 3A PRIOR ART
FIG. 3A is a schematic cross-sectional view of segments of a roller crusher according to the prior art.

As also illustrated in FIG. 3A, each flange 36 is arranged on an end of the roller 3 such that an inner surface 39 of the flange 36 is located at a distance F from the end of the opposing roller 4. The distance F is necessary to avoid contact between the flange 36 and roller 4 which could lead to material damage. At the same time, the distance F should not be too large, as that increases the risk of material leaving the roller crusher through the gap thus formed. The distance F may be realized by mounting the flange 36 to the roller 3 via shims 15, best illustrated in FIG. 3A. The purpose of the flanges 36, 36' is to prevent material from exiting the gap at the end thereof, thereby forcing all material that enters the roller crusher to pass through the crushing gap to be crushed. An alternative embodiment of a roller crusher with flanges is illustrated in FIG. 2B. The only difference between the two embodiments is that the roller crusher in FIG. 2B has flange 36 disposed on the second grind roller 4' instead of the first grind roller 3', which means that each of the grinding rollers 3', 4' has one flange 36, 36' each. As readily appreciated by the person skilled in the art, the technical effect of preventing material to exit the roller crusher 1, 1' at the ends of the gap will be equally well achieved for both disclosed embodiments. Importantly, the disclosed inventive concept is equally applicable to both these embodiments.

As previously mentioned, the gap between the rollers 3, 4 can be adjusted. For crushing operation, the roller crusher 1 is preset to have a specific distance between the rollers, the so-called start-up gap G. This is illustrated in FIG. 3A. The start-up gap G is selected based on several different factors, such as the roller crusher size (i.e. grinding roller diameter), the desired properties of crushed material etc. The start-up gap G may be in the range 10 to 140 mm. However, typically, the start-up gap G is within the range 60 to 90 mm.

As initially described, a problem with this type of grinding assemblies is that material tend to build up at the corner 40 (see FIG. 3A) between the envelope surface 37 of the grinding roller 3 and the inner surface 39 of the flange 36, 36'. Such material build-up 41 is schematically illustrated in FIG. 3A for the roller crusher 1 of FIGS. 1 and 2A, and is generally unwanted as it generates increased local loads in this area during operation, which may cause wear, damage and/or deformation on the opposite grinding roller 4 which does not have a flange as well as on the flanges 36, 36'. To provide a solution to this problem, means for removing at least a part of this build-up material 41 is provided. The current disclosure relates to such means, in the form of a scraper device 200 which utilizes mechanical scrapers 100. The mechanical scrapers 100 will first be discussed with reference to FIGS. 3A to C, followed by a description of the scraper device 200, 200' and 300 with reference to FIGS. 3 to 10.

Figure 3B:
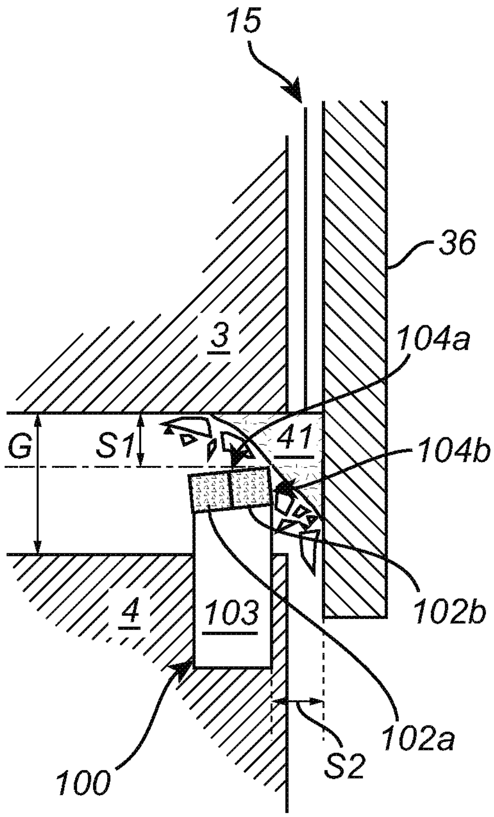
FIG. 3B is a schematic cross-sectional view of segments of a roller crusher according to an embodiment of the disclosure.
Figure 3C:
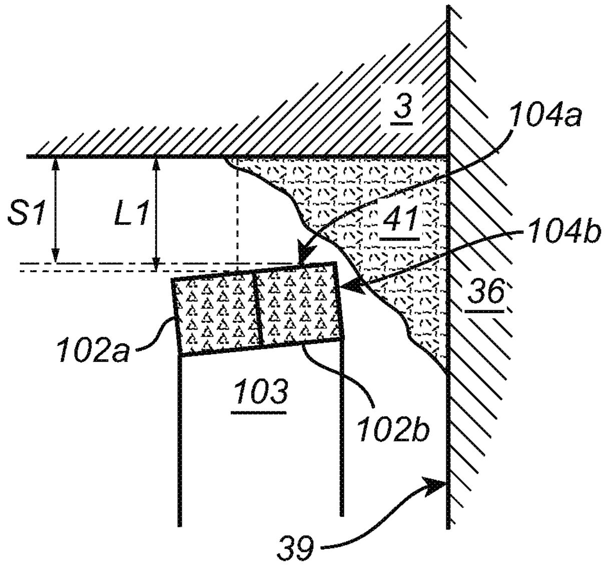
FIG. 3C is an enlarged view of parts of FIG. 3B highlighting the position of the scraper surfaces relative to the roller surface.

FIG. 3B illustrates a mechanical scraper 100 according to an embodiment of the disclosure. The mechanical scraper 100 is attached to a scraper device 200 which will be described in detail later but is here illustrated in isolation with respect to the grinding rollers 3, 4 to enhance clarity. The mechanical scraper 100 comprises two wear members 102*a*, 102*b* disposed at an end of the scraper 100 so as to define a scraping surface 104*a* generally facing the roller 3, and a scraping surface 104*b* generally facing an inner surface 39 of the flange 36. The wear members 102*a*, 102*b* are attached to scraper main body 103. As illustrated in FIG. 3C, which shows parts of FIG. 3B enlarged, the wear members 102*a*, 102*b* may be arranged on the scraper main body 103 such that a distance L1 between the envelope surface 37 of the roller 3 and the scraping surface 104*a* decreases towards the flange 37. This allows for material to more easily be transported away from the corner 40 between the inner surface 39 of the flange 36 and the envelope surface 37 of the roller 3 once scraped off, thus contributing to an efficient material removal process.

The nature of the material build-up 41 and the speed at which the at least one mechanical scraper 100 and the material build-up 41 meets, tend to make material removal substantially impact-driven. Hence, instead of the scraper with time creating a carved recess in the build-up material, large surface portions of the material build-up 41 are more or less instantaneously broken off when encountering the scraper. This is schematically illustrated in FIG. 3B. The remaining portion of the material build-up 41 has been found to present a relatively uniform outer surface. It is not necessary to remove the material build-up 41 completely. Preferably, only parts of the build-up 41 should be removed. The partial removal of the material build-up 41 will reduce overall wear of the scraper 100 as it is exposed to a significantly less degree of wear when positioned further away from the roller surface 37. As illustrated in FIG. 3B, the scraper 100 is positioned at a minimum flange distance S2 from the inner surface of the flange 36. As can be seen in FIGS. 3A and B, this minimum flange distance S2 is larger than the distance F between the roller 4 and the inner surface 39 of the flange 36. This may appear somewhat surprising, as it can be expected that the scraper 100 may miss removing material necessary to be removed in order to completely avoid contact between roller 4 and the material build-up 41. However, positioning the scraper 100 closer to the flange 36 is associated with other disadvantages. Firstly, it increases the risk of the scraper 100 being damaged by the flange 36 and/or material build-up 41 on the flange 36, a risk that increases with decreasing distance to any moving surface. Secondly, it increases the risk of damaging the flange 36 itself. By positioning the scraper 100 at a minimum flange distance S2 being larger than the distance F, a reasonable trade-off is obtained. A sufficient amount of material is removed from the build-up material 41 at the flange 36, while keeping the scraper 100 at a safe distance from the flange 36, which results in a prolonged scraper life as well as flange life. Preferably, the scraper 100 is positioned such that a minimum flange distance S2 between each scraping surface 104*a*, 104*b* of the at least one scraper 100 and an inner surface 39 of the flange 36 is 1-25 mm. More preferably, the scraper 100 is positioned such that a minimum flange distance S2 between each scraping surface 104*a*, 104*b* of the at least one scraper 100 and an inner surface 39 of the flange 36 is at least 11 mm. The risk of flange damage has been found to be significantly reduced at this distance. Needless to say, flange bending is unwanted as it will allow material to slip out from the crusher gap at the sides, hence leading to parts of the material bypassing the roller crusher, with an end result that the material output from the roller crusher will not have the specified size distribution.

The scraper 100 is only schematically illustrated in FIG. 3B to allow defining the preferred position of the scraper 100 in relation to the roller crusher 1, or more specifically, in relation to the roller envelope surface 37 and/or flange 36. Turning instead to FIGS. 4 to 9, it will be described in detail how scrapers, such as the scraper 100 of FIG. 3B, may be mounted on a scraper device 200, 200' for use on a roller crusher 1.

The scraper device 200, 200' is essentially a multi-scraper device having the capability to exchange scrapers 100 at an operating position P located at a roller envelope surface 37 or a roller 3 with a flange 36. The ability to exchange scrapers 100 are achieved by providing a rotatable multi head scraper unit 210, 210' which carries the mechanical scrapers 100. During operation of the roller crusher 1, one of the scrapers 100 is positioned in the operating position P and performs scraping of build-up material 41 present on the end of the roller 3, whereas the other scrapers 100 are positioned further away from the roller envelope surface 37 and consequently are idle scrapers not performing any scraping. Thus, only one scraper 100 of the scraping device 200 performs scraping at any point in time. Two different example embodiments of a rotatable multi head scraper unit 210, 210' will now be described with reference to FIGS. 4 and 5.

Figure 4:
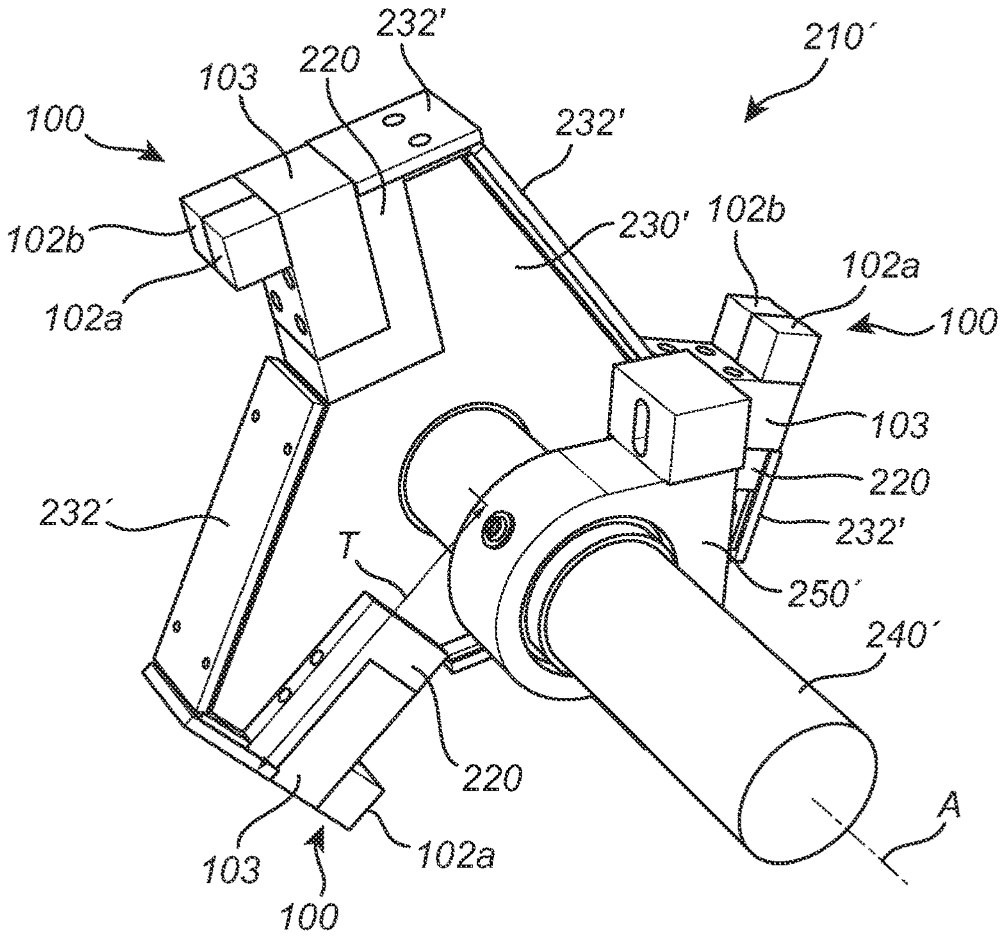
FIG. 4 is a perspective view of a rotatable multi head scraper unit according to an embodiment of the disclosure.

FIG. 4 illustrates a rotatable multi head scraper unit 210' according to a first example embodiment. The rotatable multi head scraper unit 210' has at least two scrapers 100 (for this particular example embodiment: 3 scrapers 100) arranged tangentially about the rotatable multi head scraper unit 210' at a respective radial distance T from a rotational axis A of the rotatable multi head scraper unit 210'. For the example embodiment, the scrapers 100 are mutually equidistantly spaced at 120 degrees from each other. In other words, for this non-limiting example embodiment, the rotatable multi head scraper unit 210' is symmetric. The rotatable multi head scraper unit 210' comprises a spider 230' which is attached to a rotationally arranged shaft member 240' which in turn is rotationally attached to a part of a roller crusher via a support structure 250'. As previously described, each scraper 100 comprises a scraper body 103 and two wear members 102*a*, 102*b* which presents the wear surfaces 104*a*, 104*b*. Each scraper 100 is releasably fastened to the spider 230' at dedicated support structures 220 by bolting. The bolting allows for an easy assembly procedure when preparing a rotatable multi head scraper unit 210' for being mounted on a roller crusher 1. The rotatable multi head scraper unit 210' further comprises wear protective elements 232' structured and arranged to protect the peripheral edges of the spider 230' from abrasive wear. During scraping operation, significant material will impact the rotatable multi head scraper unit 210' and in an absence of the wear protective elements 232', the spider 230' would risk being irreversibly damaged even before all three scrapers 100 has served their time. The rotatable multi head scraper unit 210' is attached to a shaft member 240' which is rotatably attached to support arrangement 250'. The support arrangement 250' is structured and arranged to be connected to a frame 2 of the roller crusher 1.

Figure 5:
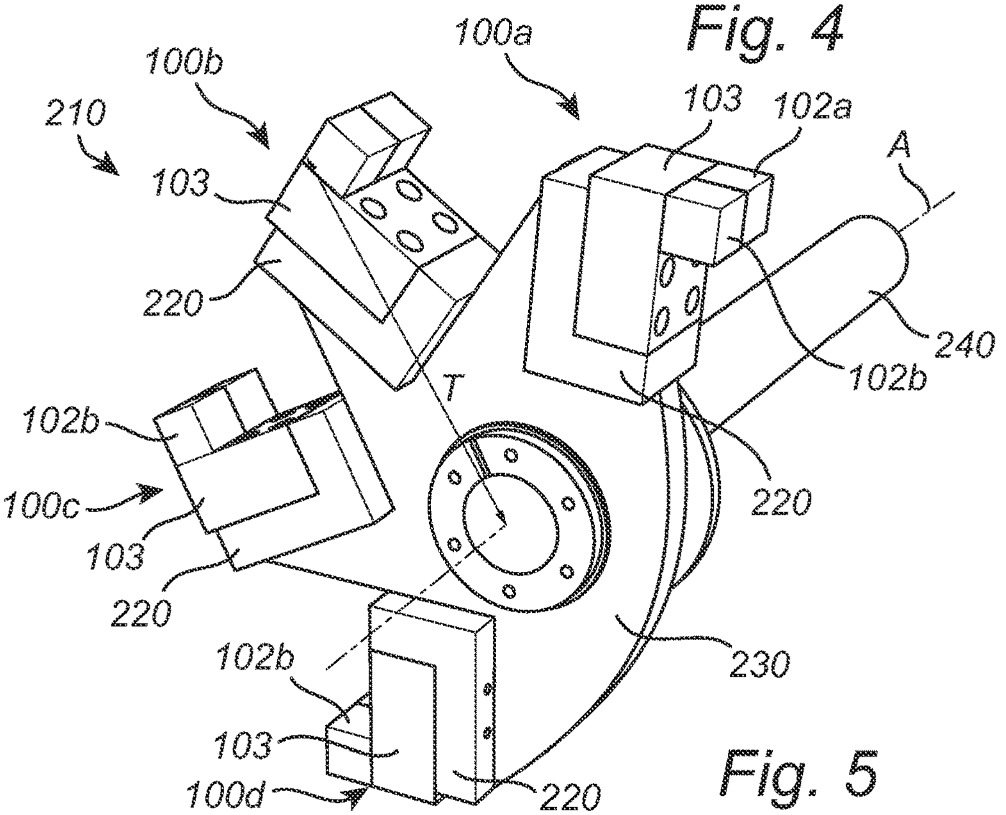
FIG. 5 is a perspective view of a rotatable multi head scraper unit according to another embodiment of the disclosure.

FIG. 5 illustrates a rotatable multi head scraper unit 210 according to a second example embodiment. The rotatable multi head scraper unit 210 also comprises at least two scrapers (for this particular example embodiment: 4 scrapers 100*a*, 100*b*, 100*c* and 100*d*) arranged tangentially about the rotatable multi head scraper unit 210 at a respective radial distance T from a rotational axis A of the rotatable multi head scraper unit 210. The scrapers 100*a-d* are equidistantly spaced but in contrast to the first example embodiment, the scrapers 100*a-d* of the second example embodiment are not mutually equidistantly spaced from each other. Instead, all four scrapers 100 are nonuniformly distributed so as to be disposed generally on one side of the rotatable multi head scraper unit 210, leaving the opposite side of the rotatable multi head scraper unit 210 free from scrapers. In other words, the rotatable multi head scraper unit 210 is asymmetric. However, the scrapers 100*a-d* and their associates support structures 220 may be the same as the ones illustrated in FIG. 4 for the first example embodiment and are therefore not further described here. Another way of describing the positioning of the scrapers 100*a-d* is in terms of a line of scrapers. When positioning a new rotatable multi head scraper unit 210 on a roller crusher 1, the rotatable multi head scraper unit 210 is arranged with respect to the roller envelope surface 37 such that scraper 100*a* will be positioned in the operating position P. Hence, scraper 100*a* will be the first scraper to perform scraping. For this reason, the scraper 100*a* is termed herein the “first-in-line scraper”. The first-in-line scraper 100*a* is followed by scraper 100*b* and 100*c* and finally by scraper 100*d*, the later termed herein as the “last-in-line scraper”. For the second example embodiment illustrated in FIG. 5, the first-in-line scraper 100*a* and the last-in-line scraper 100*d* are positioned such that these are separated with an angle of about 180 degree upstream of the first-in-line scraper 100*a*. Thus, whereas downstream of the first-in-line scraper 100*a*, there is provided both a scraper 100*b* and a scraper 100*c*, there are no scrapers arranged directly upstream of the first-in-line scraper 100*a*. Many alternative embodiments of the rotatable multi head scraper unit are contemplated. For example, a first-in-line scraper and a last-in-line scraper may be positioned such that these are separated with an angle of at least 120 degree upstream of the first-in-line scraper. The spider 230 of the rotatable multi head scraper unit 210 is also asymmetric and presents, on its scraper-free side, a rounded profile extending radially outwardly only a fraction of the distance T. The provision of the asymmetrical rotatable multi head scraper unit 210 with the spider 230 shaped in this way provides an alternative way to minimize problems with wear damage. Instead of actively protecting the rotatable multi head scraper unit by means of wear protective elements as for the first example embodiment, damage is minimized for the second example embodiment by a design which minimizes the risk of material impacting on a scraper 100 which is idle and waiting to serve as operating scraper. The rotatable multi head scraper unit 210 is releasably attached to a shaft member 240. It may be beneficial to provide the releasable attachment using a quick fastener, as this will reduce time for replacement of the rotatable multi head scraper unit 210. Such a releasable fastening device may be e.g. a flange connection or a bushing. The bushing may be e.g. a tapered bushing, an XT bushing, or a QD bushing. For the second example embodiment disclosed herein, a QD bushing 234 is used. Such QD bushings 234 are well known in the art and are therefore not further described herein. The shaft member 240 is rotatably attached to a support arrangement 250 which is omitted from FIG. 5 to increase clarity but are described in detail later with reference to FIGS. 8 and 9. The support arrangement 250 is structured and arranged to be connected to a frame 2 of the roller crusher 1.

Figure 6:
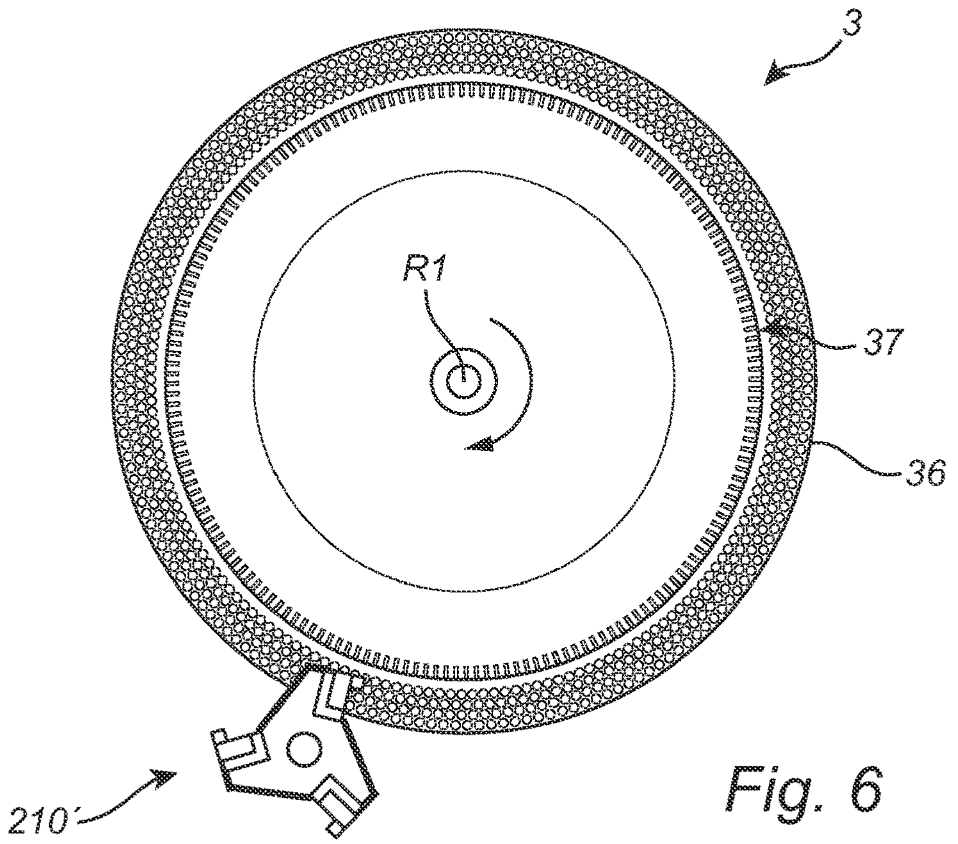
FIG. 6 is a cross-sectional side view of the rotatable multi head scraper unit of FIG. 4 arranged at a lower end of a roller with a flange according to an embodiment of the disclosure.
Figure 7:
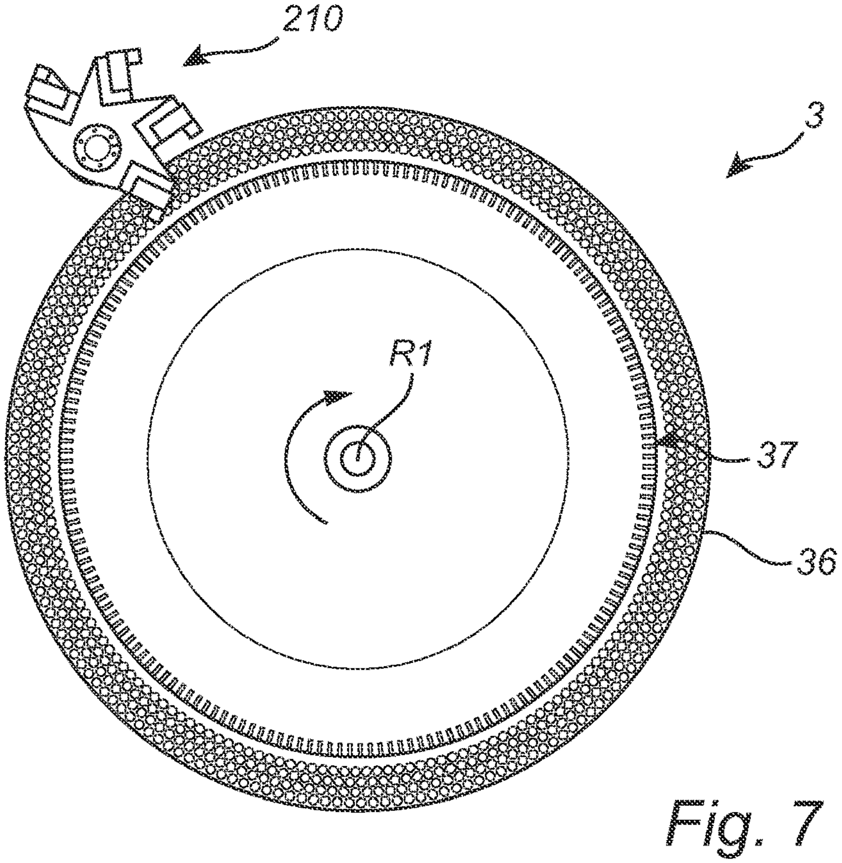
FIG. 7 is a cross-sectional side view of the rotatable multi head scraper unit of FIG. 5 arranged at an upper end of a roller with a flange according to an embodiment of the disclosure.

The rotatable multi head scraper unit 210, 210' of the inventive concept has the advantage that it can provide both an active scraper and a series of back-up scrapers at a relatively limited space at a grinding roller 3 of a roller crusher 1. It is contemplated that the rotatable multi head scraper unit 210, 210' may be arranged at different positions with respect to the grinding roller 3 dependent on the type of roller crusher 1. This is illustrated in FIG. 6 which discloses the rotatable multi head scraper unit 210' of the first example embodiment located at about seven o’clock, i.e. at a lower end of the roller 3, and in FIG. 7 which discloses the rotatable multi head scraper unit 210 of the second example embodiment located at about 11 o’clock, i.e. at an upper end of the grinding roller 3.

Two example embodiments of the scraper device, the scraper device 200' and 200, will now be described with reference to FIGS. 8 and 9. The only difference between the two scraper embodiments is that the first embodiment, scraper device 200' in FIGS. 8A and B, is equipped with rotatable multi head scraper unit 210' of FIG. 4, whereas the second embodiment, scraper device 200 in FIGS. 9A and B, is equipped with rotatable multi head scraper unit 210 of FIG. 5. Since the two embodiments have so many features in common, they will be described together herein.

Both the rotatable multi head scraper unit 210' and the rotatable multi head scraper unit 210 may be releasably attached to the shaft member 240 by means of QD bushing 234. The shaft member 240 extends from a first end 241 at which the rotatable multi head scraper unit 210, 210' is arranged, to a second end 242 at which the shaft member 240 connects to a rotation actuator 202, which will be described in detail later.

Figure 8A:
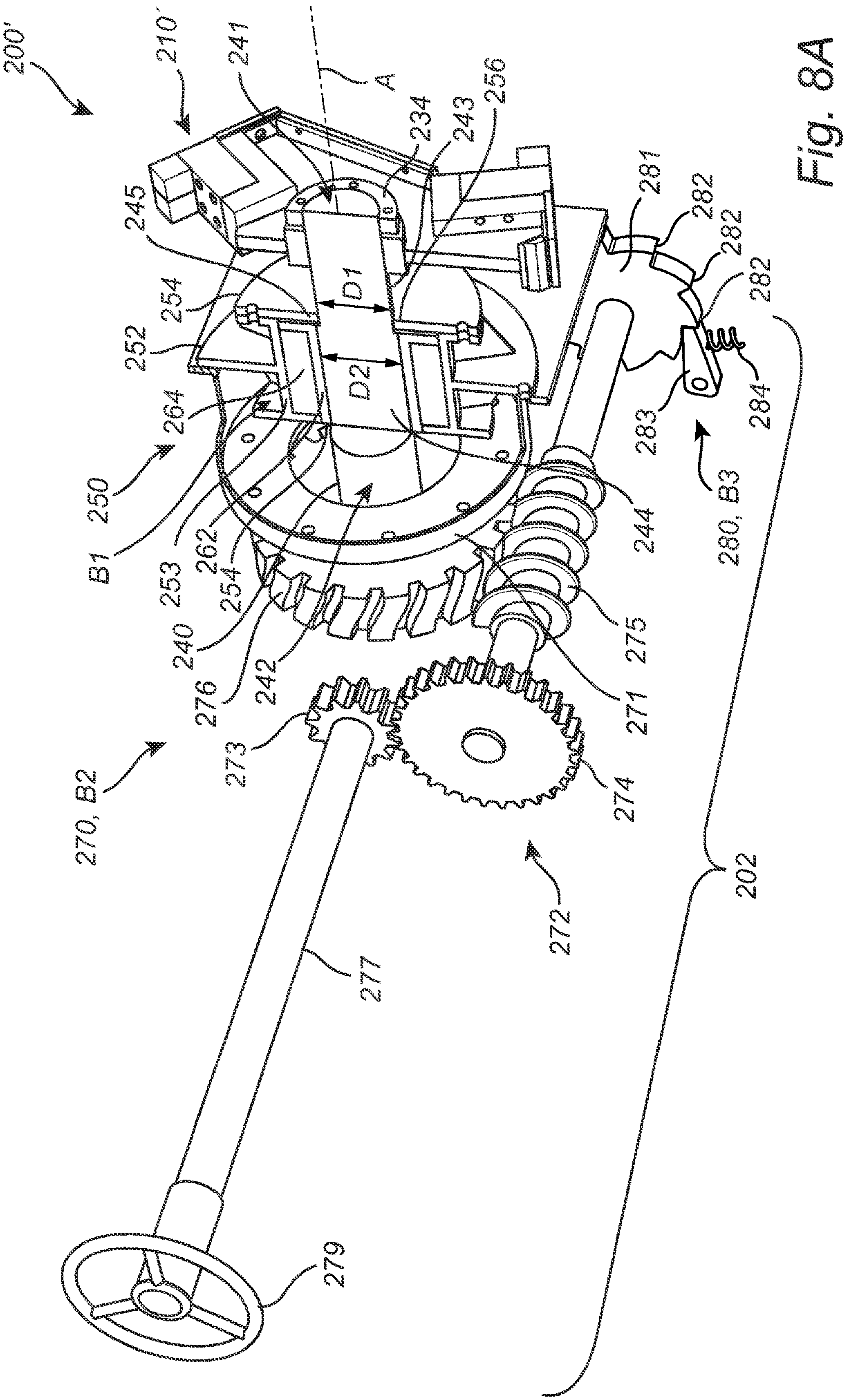
FIG. 8A is a perspective view with a partial cut-through of a scraper device carrying the rotatable multi head scraper unit of FIG. 4 according to an embodiment of the disclosure.
Figure 8B:
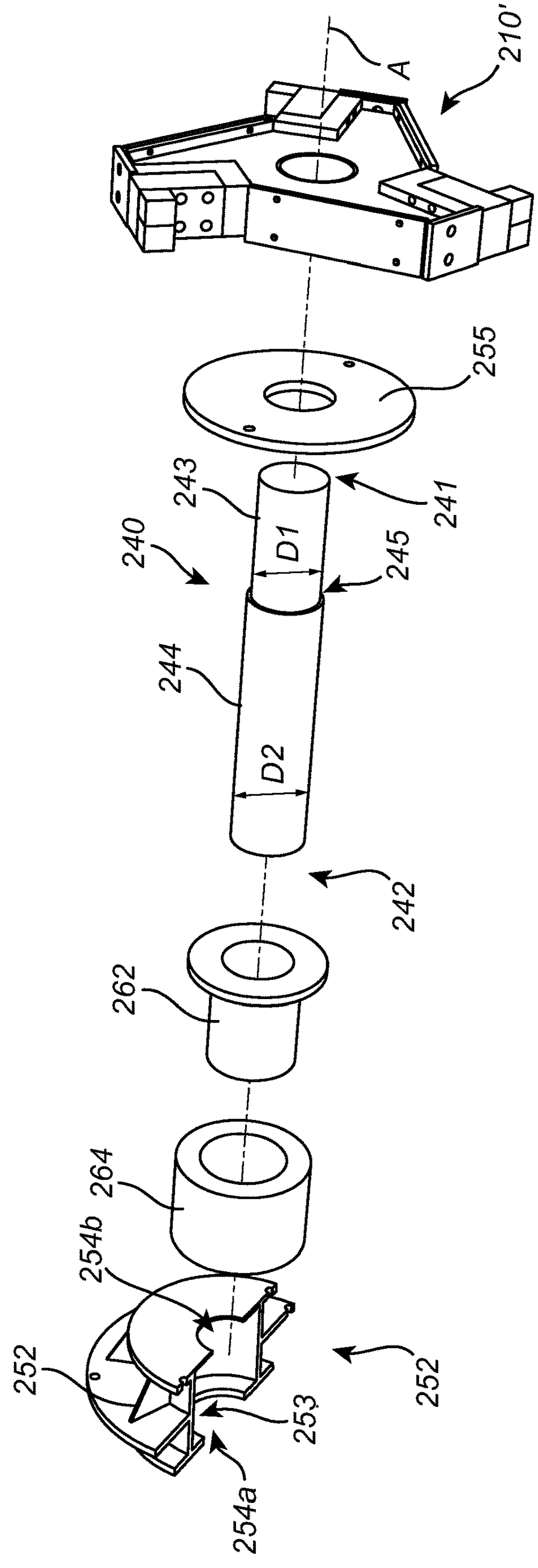
FIG. 8B is an exploded perspective view of parts of the scraper device and rotatable multi head scraper unit of FIG. 8A.
Figure 9A:
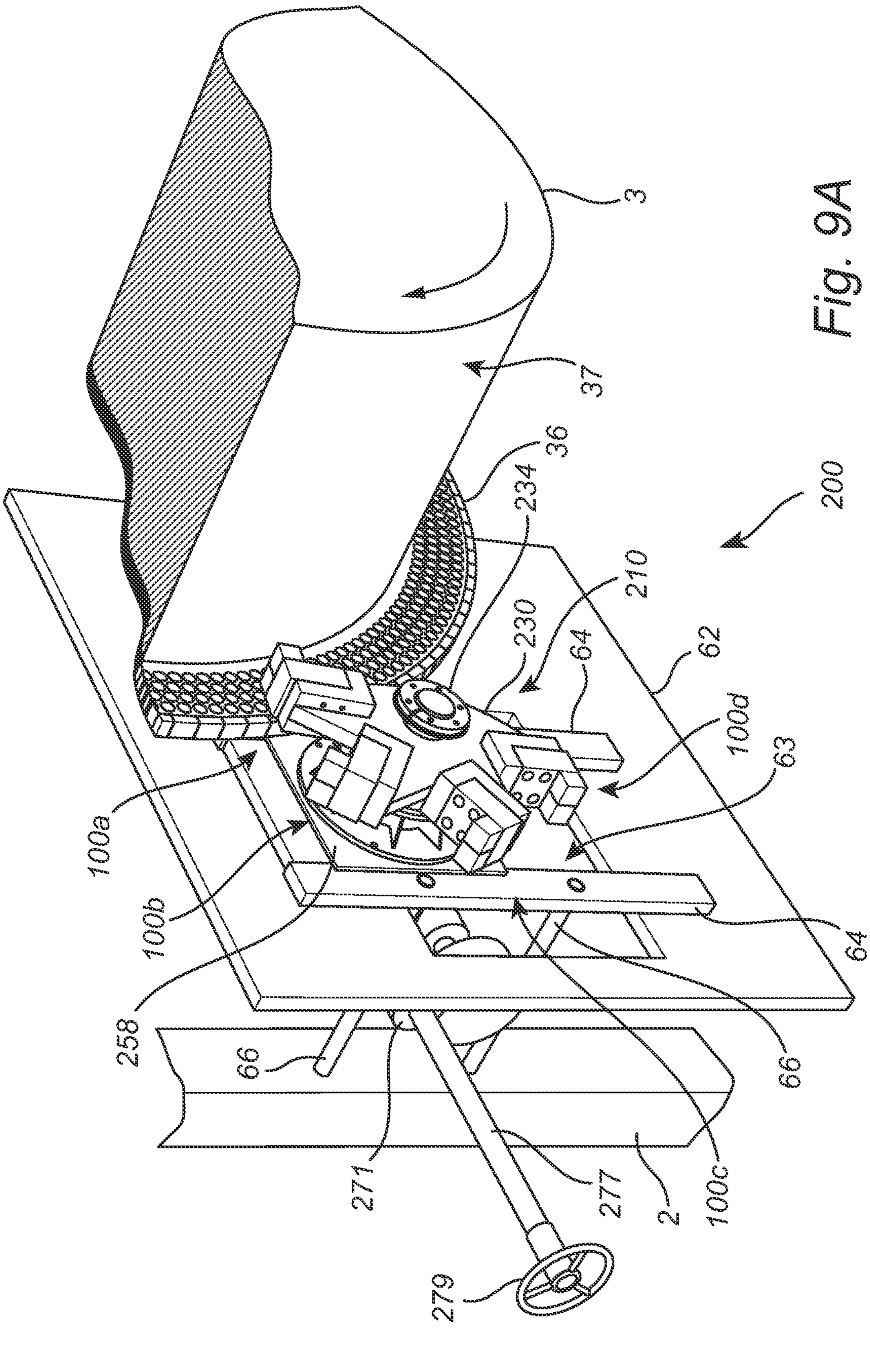
FIG. 9A is a perspective view of the scraper device of FIG. 8A but here instead carrying the rotatable multi head scraper unit of FIG. 5 according to another embodiment of the disclosure.
Figure 9B:
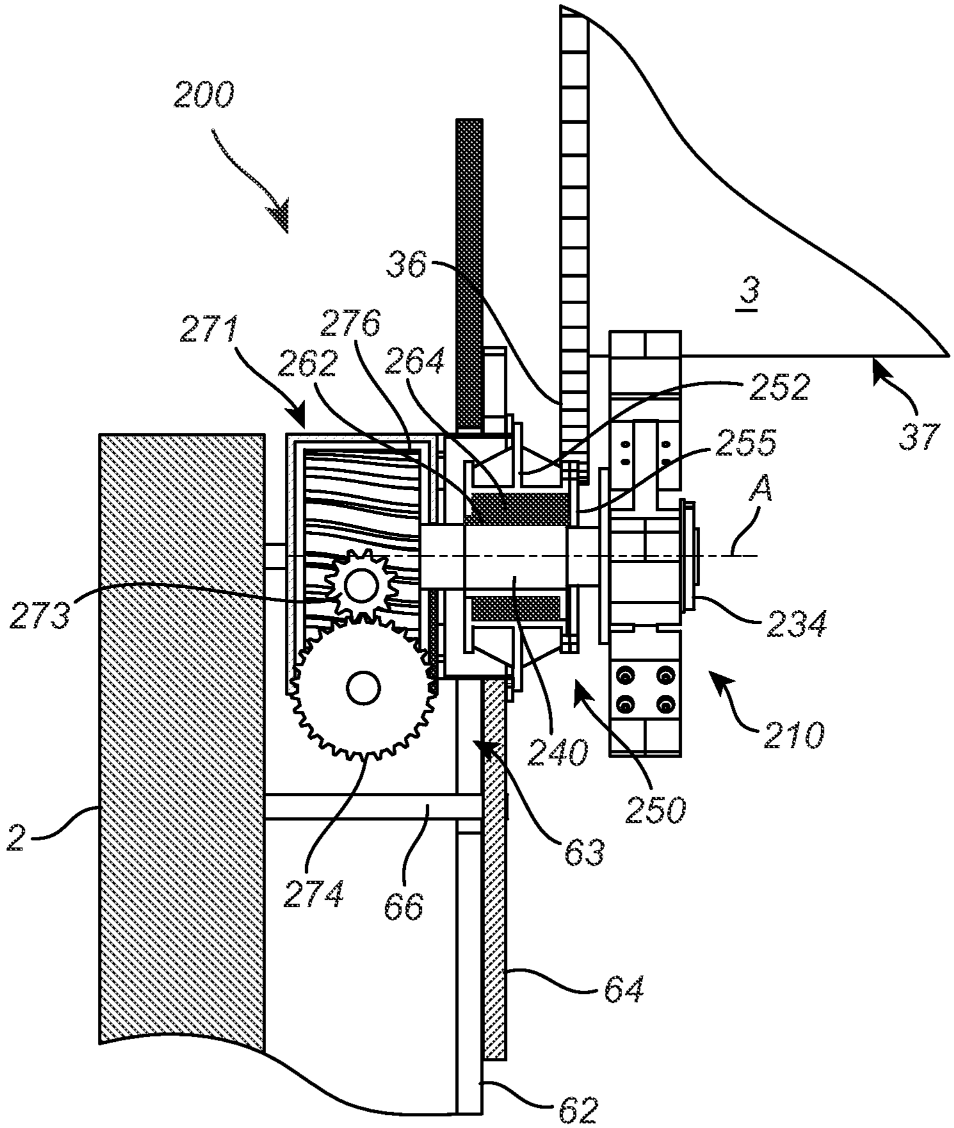
FIG. 9B is a front view with a partial cut-through of the scraper device and rotatable multi head scraper unit of FIG. 9A.

As illustrated in FIGS. 8A and B, the shaft member 240 is a stepped shaft. The shaft member 240 has a first shaft portion 243 which connects to the first end 241 and a second shaft portion 244 which connects to the second end 242. The first shaft portion 243 has a first shaft diameter D1 and the second shaft portion 244 has a second shaft diameter D2.

The first shaft diameter D1 is smaller than the second shaft diameter D2, and the shaft member 240 presents an annular surface 245 substantially transverse to the rotational axis A at the intersection between the annular surface 245 and the first shaft portion 243. The purpose of the annular surface 245 will be described in what follows.

The scraper device 200', 200 further comprises a support arrangement 250 which is arranged to at least partially encircle the shaft member 240 and further arranged to be connected to a frame 2 of the roller crusher 1. The support arrangement 250 comprises a bracket 252 which is mounted onto a mounting plate 258. The mounting plane 258 is in turn connected to support structures 64 which are connected to the frame 2 of the roller crusher 1 by means of support rods 66. (see FIGS. 9A and B). Also seen in FIGS. 9A and B is parts of a dust enclosure 62 inside which the rotatable multi head scraper unit 210 is arranged. However, as readily appreciated by the person skilled in the art, the scraper device 200 is not supported by the dust enclosure 62. It extends through an opening 63 of the dust enclosure 62 but is fully supported by the frame 2.

The bracket 252 has through-holes 254 on opposite sides thereof, through which through-holes 254 the shaft member 240 extends. The bracket 252 presents an interior space in which is housed a first brake arrangement B1 configured to prevent and/or restrict rotation of the rotatable multi head scraper unit 210 during scraping operation by exerting a radially inwardly directed pressure onto the shaft member 240. The first brake arrangement B1 comprises a friction element 262 arranged to encircle the second shaft portion 244 of the shaft member 240 so as to be in abutment therewith. The first brake arrangement B1 further comprises a supporting element 264 which is made from an elastomeric material, such as rubber or polyurethane. The supporting element 264 encircles the friction element 262 and is arranged within a supporting structure 253 which for the example embodiment forms a part of the bracket 252. The supporting structure 253 at least partially encloses the supporting element 264 and thereby serves to spatially constrain the supporting element 264 radially outwardly and axially in the direction towards the gear box 270. The supporting element 264 is compressed from the outside by tightening bracket cap 255 to the bracket 252. This compression of the supporting element 264 will affect its elastomeric material such that it expands in other directions, i.e. axially towards the gear box 270, radially outwardly and radially inwardly towards the friction element 262. Since any expansion directed axially and radially outwardly is effectively prevented by the support structure 253, the net result will be that the supporting element 264 compresses the friction element 262 which in turn exerts a pressure onto the shaft member 240. As readily appreciated by the person skilled in the art, this will create a latent rotational resistance or damping in the mechanical system, thereby providing the first brake arrangement B1. Finally, the bracket cap 255 has a trough-hole 256 which has a smaller diameter than the diameter of the adjacently disposed through-hole 254*b* of the bracket 252. The diameter of the through-hole 256 is selected to match the first shaft diameter D1 of the first shaft portion 243, whereas the through-holes 254*a* and 254*b* are selected to match the second shaft diameter D2 of the second shaft portion 244. Importantly, the diameter of the through hole 256 is smaller than the second shaft diameter D2. This allows using the bracket cap 255 for retraining the shaft member 240 within the support arrangement 250 (and thereby on a roller crusher) when tightening the bracket cap 255 with respect to the bracket 252 (the shaft member 240 is retained from the opposite side by a gear box 270 which will be described in what follows).

The rotation actuator 202 comprises a gear box 270 and a maneuvering wheel 279. The maneuvering wheel 279 is attached to a drive shaft 277 of the gear box 270 and is used to supply kinetic energy in the form of rotational motion to the scraper device 200 for rotating the rotatable multi head scraper unit 210 when there is a need to exchange a worn-out scraper (such as e.g. the front-in-line scraper 100*a*) to a next-in-line scraper (in the example: the scraper 100*b*). The gear box 270 comprises a gear train 272 which mechanically interconnects the drive shaft 277 with the shaft member 240. The gear box 270 further comprises a housing 271 which supports the gear train and protects the same from foreign objects which may risk damaging the gear train 272. The housing 271 is only partly shown in FIG. 8A to enhance clarity but is illustrated also in FIGS. 9A and B. The drive train 272 comprises a drive gear 273 attached to drive shaft 277. The drive gear 273 engages first idler gear 274 which has a gear diameter being larger than the gear diameter of the drive gear 273, thereby providing a gear ratio larger than one. The first idler gear 274 is arranged on idler shaft 278 at a first end thereof and a second idler gear 275 is arranged on idler shaft 278 at a second end thereof. As illustrated in FIG. 8A, the second idler gear 275 is a worm, or sometimes: worm screw, which is a gear in the form of a screw. The second idler gear 275 engages the driven gear 276 which connects to the shaft member 240. The driven gear 276 is a worm wheel which meshes with the worm. The second idler gear 275 and the driven gear 276 are sometimes together referred to as a worm drive. A purpose of providing a worm drive in the gear box 270 is twofold: Firstly, the worm drive will allow altering the rotational axis 90 degree with respect to the shaft member 240, which may be beneficial for some applications due to e.g. space constrains. Secondly, the worm drive provides a relatively large gear ratio, which also may be beneficial as will be explained in what follows.

The (overall) gear ratio of the gear train 272 is defined as the ratio between the number of rotations of the drive gear 273 and the number of rotations of the driven gear 276. This implies that a gear ratio larger than 1 will allow a larger number of revolutions caused by applying a lower torque to the drive gear 273 to be transformed into a lower number of revolutions with a higher torque on the driven gear 276. A gear box 270 having a gear train 272 with a gear ratio larger than 1 may be beneficial for several reasons. Firstly, as previously mentioned, it provides a means for transforming a low-torque rotation to a high torque rotation. This may be advantageous as it allows to maneuver the rotatable multi head scraper unit 210 manually by hand, in the example embodiment by means of the maneuvering wheel 279. However, the gear box 270 of the scraper device 200 also serves another function: it constitutes a brake arrangement, termed herein as the second brake arrangement B2. As readily appreciated by the person skilled in the art, any gear box will provide some degree of braking, in the sense of preventing and/or restricting rotation. This function arises as a result from frictional forces and inertial forces in the drive train. However, the ability of the gear train to function as a brake increases with increasing gear ratio (which is why we tend to use the reverse gear or the first gear after having parked our cars, the reverse gear and first gear having the largest gear ratio). In other words, the gear ratio will affect the level of brake power that the gear box 270 may provide to the rotatable multi head scraper unit 210. Specifically, the brake power will increase with increasing gear ratio of the gear train 272.

Turning again to FIG. 8A which illustrates these features most clearly, the scraper device 200', 200 may further comprise a third brake arrangement B3 in the form of a ratchet arrangement 280. The ratchet arrangement 280 is disposed at an end of the idler shaft 278 and comprises a ratchet wheel 281 attached to the idler shaft 278, and a pawl 283 which is pivotably arranged in the gear box 270. The pawl 283 is biased towards the ratchet wheel 281 by means of a spring 284. The ratchet wheel 281 comprises a plurality of teeth 282 which are asymmetrical with each tooth having a moderate slope on one edge and a much steeper slope on the other edge. When the teeth 282 move in the opposite (backward) direction, the pawl 283 will catch against the steeply sloped edge of the first tooth 282 it encounters, thereby locking it against the tooth 282 and preventing any further motion in that direction.

Figure 10:
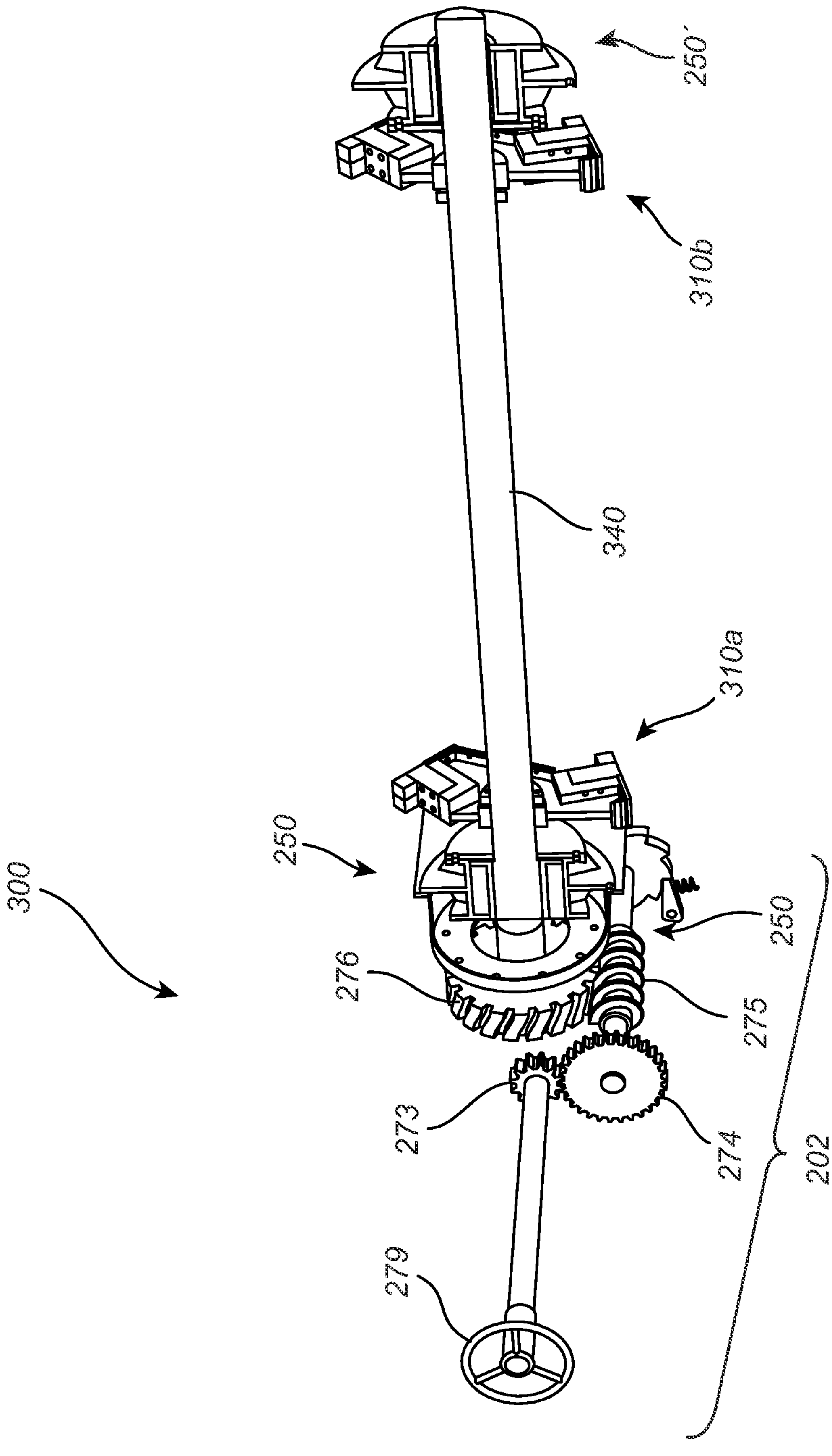
FIG. 10 is a perspective view with a partial cut-through of a scraper device according to another embodiment of the disclosure carrying a rotatable multi head scraper unit of FIG. 4.

FIG. 10 illustrates a scraper device 300 according to an alternative example embodiment. The scraper device 300 differs from the scraper device 200' in that the shaft member 340 extends all the way to the other side of the roller crusher where a second support arrangement 205' supports the shaft. As can be seen in FIG. 10, the scraper device 300 comprises two rotatable multi head scraper units 310*a*, 310*b*, each rotatable multi head scraper unit 310*a*, 310*b* having at least two scrapers 100 arranged tangentially about the rotatable multi head scraper unit 310*a*, 310*b* at a respective radial distance from a rotational axis A. The rotation actuator 300 is further arranged to selectively rotate both rotatable multi head scraper units 310*a*, 310*b* together. As readily appreciated by the person skilled in the art, the rotatable multi head scraper units 310*a*, 310*b* cannot be mounted onto the shaft member 340 in the same manner as for the previously disclosed example embodiments. Therefore, the rotatable multi head scraper units 310*a*, 310*b* may consist of two separate parts which are joined together from opposite sides of the shaft member 340 as seen transversely to the rotational axis A.

Figure 11:
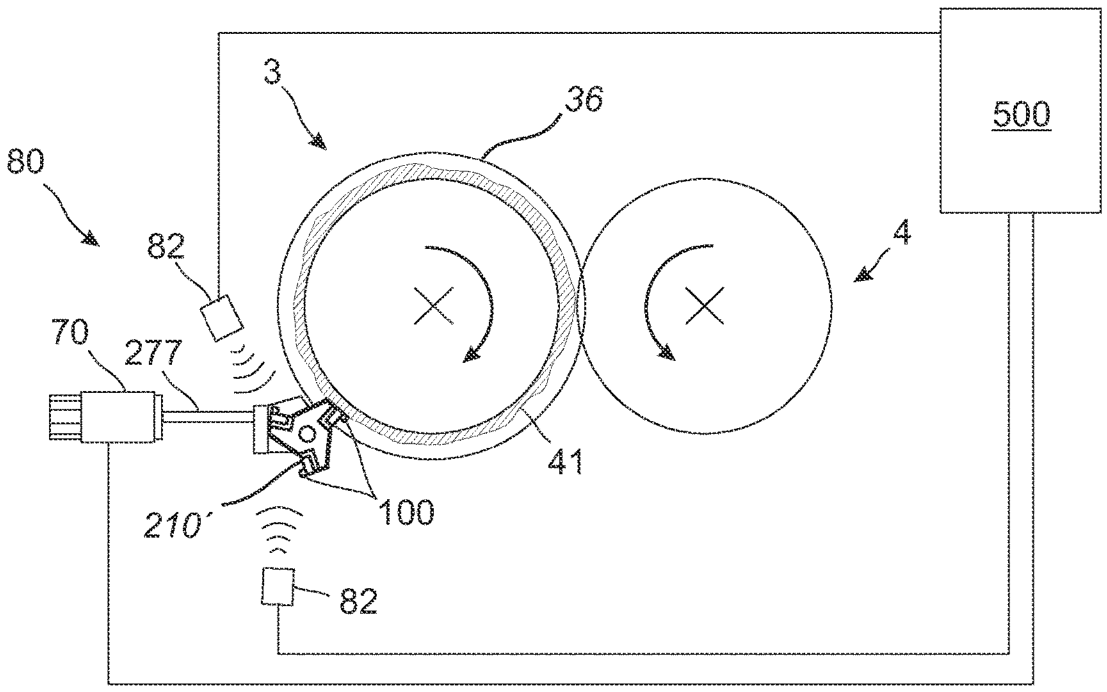
FIG. 11 is a schematic side view of parts of a roller crusher, a scraper device and a sensor system for monitoring the condition of the scraper device according to an example embodiment of the disclosure.

FIG. 11 illustrates a sensor system 80 for a roller crusher 1 used together with a scraper device 400 according to an example embodiment of the disclosure. The scraper device 400 is similar to the scraper device 200' of FIG. 8A but differs in that it further comprises a drive unit 70, in the form of an electrical motor. The drive unit 70 is attached to the drive shaft 277 replacing the manually operated manoeuvring wheel 279 of the scraper device 200'. The sensor system 80 comprises sensors 82 for monitoring the condition of the scraper device 400, and a control unit 500 operatively connected to the sensor system 80 and to the drive unit 70. The sensor system 80 monitors the condition of the rotatable multi head scraper unit 210' from two sides, as illustrated in FIG. 11. The sensors 82 may comprise e.g. optical sensors, such as e.g. laser-based optical sensors. The sensors 82 may alternatively or additionally comprise non-optical sensors such as e.g. microwave sensors, radar sensors or any other non-optical sensors suitable for the task. This is advantageous as it allows to automatically determine when there is a need for exchanging a worn-out scraper 100. It is contemplated that this exchange operation is available during operation of the roller crusher 1, hence removing a need for a roller crusher shut down. Moreover, the sensor system 80 may allow for an improved prediction as to when the roller crusher 1 has to be shut down for a replacement of a completely worn out rotatable multi head scraper unit 210'. For example, the sensor system 80 may be configured to determine how many scrapers 100 of the at least two scrapers are still available for scraping.

Finally, an aspect of the scraper devices of the disclosure will be described in detail with reference to FIG. 12, which illustrates the rotatable multi head scraper unit 210' and the roller 3 of FIG. 11. The particular roller and/or rotatable multi head scraper unit is not essential for this aspect, and this should be construed as an example embodiment only. An intrinsic advantage of the scraper device of the disclosure is that the rotatable multi-head scraper unit allows for adjusting a distance between the scraper which performs a scraping operation, i.e. the operating scraper, and the envelope surface of the roller by adjusting the angular position of the rotatable multi-head scraper unit. This built-in adjustment ability of the scraper device may allow adjusting the thickness of the build-up material allowed to remain on the envelope surface of the roller. It may also remove the need to mount all scrapers to the rotatable multi head scraper to have the same radial distance from the rotational axis. Furthermore, it may allow compensating for scraper wear, as will be explained in what follows.

Figure 12:
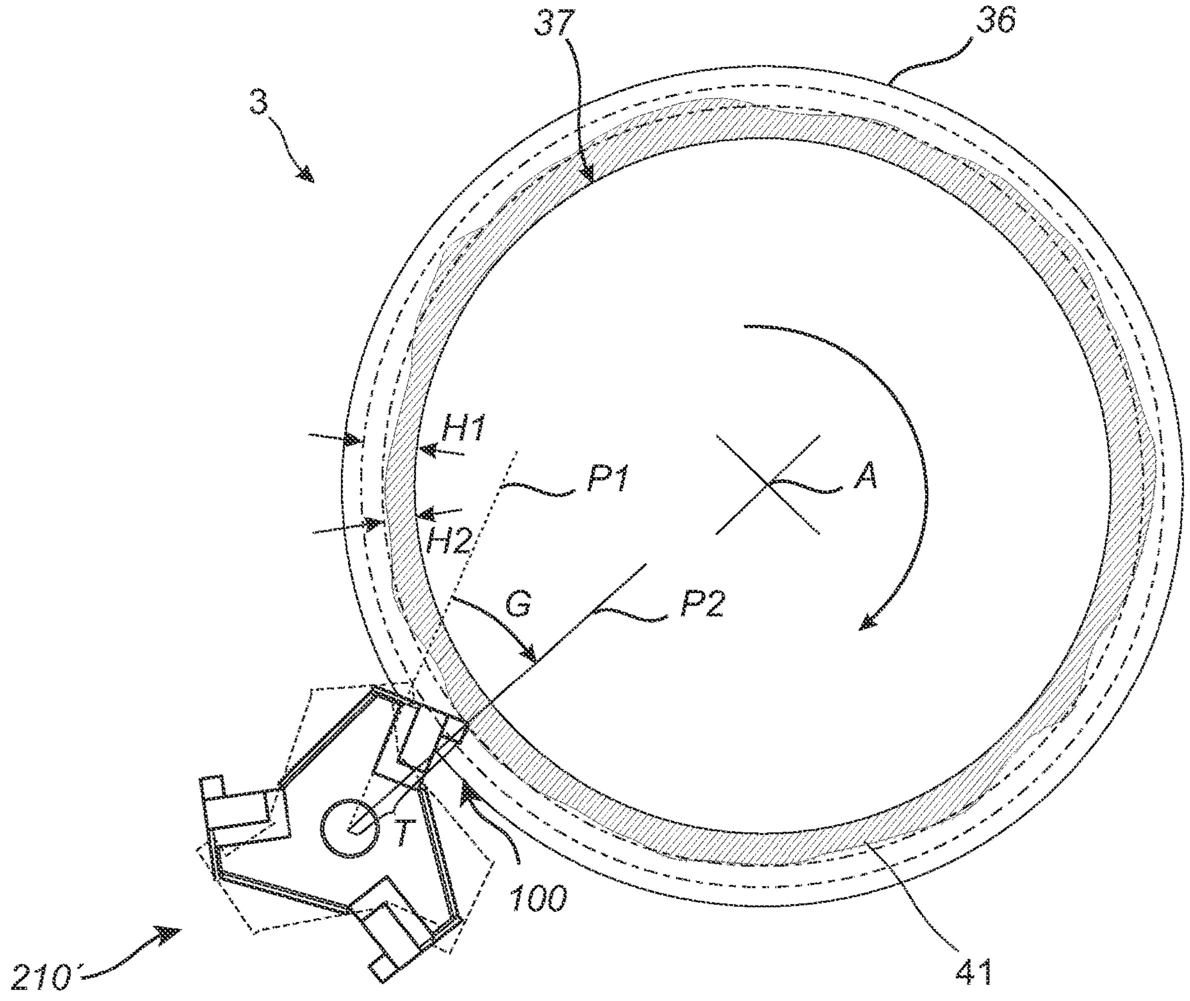
FIG. 12 is a schematic side view of a rotatable multi head scraper arranged in two different operating positions with respect to a roller according to an embodiment of the disclosure.

Scrapers, such as the scraper 100 illustrated in FIG. 12, will be exposed to wear during scraping operation. Therefore, the radial extension T of the scraper 100, i.e. the radial distance from the rotational axis A of the rotatable multi-head scraper unit 210', will gradually decrease during the life of the scraper 100. This will result in the build-up material 41 at the flange 36 to become gradually thicker with time. In other words, even if the operating scraper 100 is continuously performing an efficient scraping of build-up material 41, the scraping operation as such will not be consistent in time. By adjusting the angular position of the rotatable multi-head scraper unit 210', the operating scraper 100 may be moved to a position which is closer to the enveloped surface 37, thereby compensating for the effect of wear on the radial extension T of the scraper 100.

This is illustrated in FIG. 12 by two different operation positions P1 and P2, respectively. When the scraper 100 is first positioned in an operating position, i.e. when the rotatable multi head scraper unit 210' is selectively rotated to arrange scraper 100 to come into contact with build-up material 41, the scraper 100 is arranged at the distance H1 from the envelope surface 37 of the roller 3. This is illustrated in FIG. 12 as a first operating position P1 (indicated by line P1 defining the angular position of the scraper 100 in dashed contour). When the scraper 100 has been partially worn during operation (not shown), the rotatable multi head scraper unit 210' is selectively rotated by the angle G to a second operating position P2 at which the scraper 100 is instead arranged at a distance H2 from the envelope surface 37 of the roller 3, as defined in un-worn state of the scraper 100. It is stressed that the distances H1 and H2 are here defined for an un-worn scraper 100. As readily appreciated by the person skilled in the art, the scraper 100 will not reach the distance H2 in the second operation position P2 if being worn. Instead, the scraper 100 may in its worn state e.g. reach the distance H1, or close to the distance H1, also in the second operating position P2.

The person skilled in the art realizes that the present disclosure by no means is limited to the preferred embodiments described above. On the contrary, many modifications and variations are possible within the scope of the appended claims. Additionally, variations to the disclosed embodiments can be understood and effected by the skilled person in practicing the claimed, from a study of the drawings, the disclosure, and the appended claims.

EMBODIMENTS

Embodiment 1. A scraper device for a roller crusher, comprising a rotatable multi head scraper unit having at least two scrapers arranged tangentially about the rotatable multi head scraper unit at a respective radial distance from a rotational axis of the rotatable multi head scraper unit;

a rotation actuator arranged to selectively rotate the rotatable multi head scraper unit to allow operative use of one of the at least two scrapers at a time; and at least one brake arrangement configured to prevent and/or restrict rotation of the rotatable multi head scraper unit during operation of the one of the at least two scrapers.

Embodiment 2. The scraper device according to Embodiment 1, wherein the rotatable multi head scraper unit comprises at least three scrapers arranged tangentially about the rotatable multi head scraper unit at a respective radial distance from the rotational axis.

Embodiment 3. The scraper device according to Embodiment 1 or 2, wherein a first-in-line scraper and a last-in-line scraper are positioned such that these are separated with an angle of at least 120 degree upstream of the first-in-line scraper.

Embodiment 4. The scraper device according to Embodiment 1 or 2, wherein a first-in-line scraper and a last-in-line scraper are positioned such that these are separated with an angle of at least 180 degree upstream of the first in line scraper.

Embodiment 5. The scraper device according to any one of Embodiment 1 to 4, wherein the rotatable multi head scraper unit is releasably arranged in the scraper device, to allow exchange of the rotatable multi head scraper unit.

Embodiment 6. The scraper device according to any one of Embodiment 1 to 5, further comprising a shaft member having a first and a second end and being rotatably arranged, wherein the rotatable multi head scraper unit is attached to the first end of the shaft member, and wherein the rotation actuator is arranged at the second end of the shaft member.

Embodiment 7. The scraper device according to Embodiment 6, further comprising a support arrangement arranged to at least partially encircle the shaft member and further arranged to be connected to a frame of the roller crusher.

Embodiment 8. The scraper device according to Embodiment 7, wherein a first brake arrangement of the at least one brake arrangement is supported by the support arrangement, and wherein the first brake arrangement comprises a friction element, configured to selectively engage the shaft member, or an engagement element attached thereto, to thereby prevent and/or restrict a rotation of the rotatable multi head scraper unit.

Embodiment 9. The scraper device according to Embodiment 8, wherein the friction element is elastomeric or is attached to a supporting element which is elastomeric, and wherein the first brake arrangement further comprises a supporting structure structured and arranged to at least partially enclose the friction element or the supporting element.

Embodiment 10. The scraper device according to any one of Embodiment 1 to 9, wherein the rotation actuator comprises a gear box.

Embodiment 11. The scraper device according to Embodiment 10, wherein the gear box is configured to act as a second brake arrangement of the at least one brake arrangement.

Embodiment 12. The scraper device according to Embodiment 11, wherein the gear box comprises a gear train having a gear ratio larger than 1.

Embodiment 13. The scraper device according to any one of Embodiment 1 to 12, wherein a third brake arrangement of the at least one brake arrangement is a ratchet arrangement.

Embodiment 14. The scraper device according to any one of Embodiment 1 to 13, wherein the scraper device further comprises a drive unit arranged to provide kinetic energy to the rotation actuator for the selectively rotation of the rotatable multi head scraper unit.

Embodiment 15. The scraper device according to any one of Embodiment 1 to 14, wherein the scraper device has rotary indexing capability for selectively rotating the rotatable multi head scraper unit between predefined angular positions.

Embodiment 16. A roller crusher having two generally parallel rollers arranged to rotate in opposite directions, and separated by a gap, each roller having two ends, the roller crusher comprising:

a flange attached to one of the ends of one of the rollers, the flange extending in a radial direction of the roller, and the flange having an extension (E) past an envelope surface of the roller, wherein the roller crusher further comprises a scraper device according to any one of Embodiment 1 to 15, wherein the rotatable multi head scraper unit is arranged such that one of the at least two scrapers, by the rotation actuator, is selectively positionable at an end of a roller having a flange, and, by the at least one brake arrangement, is prevented and/or restricted to move relative to the roller to thereby at least partially allow removal of material accumulated on the flange and/or on the envelope surface at an end portion of the roller adjacent the flange.

Embodiment 17. The roller crusher according to Embodiment 16, wherein the roller crusher comprises two flanges attached to opposite ends of one of the rollers, and wherein a scraper device according to Embodiment 1 is arranged at each ends of the roller with the flanges.

Embodiment 18. A method for operating a roller crusher for grinding granular material, wherein the roller crusher has two generally parallel rollers arranged to rotate in opposite directions, and separated by a gap, each roller having two ends, the roller crusher comprising:

a flange attached to one of the ends of one of the rollers, the flange extending in a radial direction of the roller, and the flange having an extension (E) past an envelope surface of the roller, wherein the roller crusher further comprises a scraper device according to Embodiment 1, wherein the rotatable multi head scraper unit is arranged such that one of the at least two scrapers, by the rotation actuator, is selectively positionable at an end of a roller having a flange, and, by the at least one brake arrangement, is prevented and/or restricted to move relative to the roller; wherein the method comprises at least the step of:

at least partially removing material accumulated on the flange and/or on the envelope surface at an end portion of the roller adjacent the flange by means of the one of the at least two scrapers.

Embodiment 19. The method according to Embodiment 18, further comprising the step of:

rotating the multi head scraper unit such that the one of the at least two scrapers is exchanged with another one of the at least two scrapers at the end of the roller having a flange.

Embodiment 20. The method according to Embodiment 18 or 19, further comprising the step of:

rotating the rotatable multi head scraper unit such that the one of the at least two scrapers is moved from a first operating position to a second operating position, wherein a distance between the one of the at least two scrapers and the envelope surface as defined in an un-worn state of the one of the at least two scrapers is larger at the first operating position than at the second operating position.

Embodiment 21. The method according to Embodiment 19 or 20, wherein the scraper device further comprises a drive unit arranged to provide kinetic energy to the rotation actuator for the selective rotation of the rotatable multi head scraper unit, and wherein the method further comprises:

rotating the multi head scraper unit by means of the drive unit.

Embodiment 22. The method according to Embodiment 21, wherein the roller crusher further comprises a sensor system for monitoring the condition of the scraper device; and a controller operatively connected to the sensor system and to the drive unit, and wherein the method further comprises:

the control unit controlling the rotation of the multi head scraper unit based on output data from the sensor system.

The invention claimed is:

1. A scraper device for a roller crusher, comprising:

a rotatable multi head scraper unit having at least two scrapers arranged tangentially about the rotatable multi head scraper unit at a respective radial distance from a rotational axis of the rotatable multi head scraper unit;

a rotation actuator arranged to selectively rotate the rotatable multi head scraper unit to allow operative use of one of the at least two scrapers at a time; and at least one brake arrangement configured to prevent and/or restrict rotation of the rotatable multi head scraper unit during operation of the one of the at least two scrapers.

2. The scraper device according to claim 1, wherein the rotatable multi head scraper unit comprises at least three scrapers arranged tangentially about the rotatable multi head scraper unit at a respective radial distance from the rotational axis.

3. The scraper device according to claim 1, wherein a first-in-line scraper and a last-in-line scraper are positioned such that these are separated with an angle of at least 120 degree upstream of the first-in-line scraper.

4. The scraper device according to claim 1, wherein a first-in-line scraper and a last-in-line scraper are positioned such that these are separated with an angle of at least 180 degree upstream of the first in line scraper.

5. The scraper device according to claim 1, wherein the rotatable multi head scraper unit is releasably arranged in the scraper device, to allow exchange of the rotatable multi head scraper unit.

6. The scraper device according to claim 1, further comprising a shaft member having a first and a second end and being rotatably arranged, wherein the rotatable multi head scraper unit is attached to the first end of the shaft member, and wherein the rotation actuator is arranged at the second end of the shaft member.

7. The scraper device according to claim 6, further comprising a support arrangement arranged to at least partially encircle the shaft member.

8. The scraper device according to claim 7, wherein a first brake arrangement of the at least one brake arrangement is supported by the support arrangement, and wherein the first brake arrangement comprises a friction element, configured to selectively engage the shaft member, or an engagement element attached thereto, to thereby prevent and/or restrict a rotation of the rotatable multi head scraper unit.

9. The scraper device according to claim 8, wherein the friction element is elastomeric or is attached to a supporting element which is elastomeric, and wherein the first brake arrangement further comprises a supporting structure structured and arranged to at least partially enclose the friction element or the supporting element.

10. The scraper device according to claim 1, wherein the rotation actuator comprises a gear box.

11. The scraper device according to claim 10, wherein the gear box is configured to act as a second brake arrangement of the at least one brake arrangement.

12. The scraper device according to claim 11, wherein the gear box comprises a gear train having a gear ratio larger than 1.

13. The scraper device according to claim 1, wherein the at least one brake arrangement is a ratchet arrangement.

14. The scraper device according to claim 1, wherein the scraper device further comprises a drive unit arranged to provide kinetic energy to the rotation actuator for the selectively rotation of the rotatable multi head scraper unit.

15. The scraper device according to claim 1, wherein the scraper device has rotary indexing capability for selectively rotating the rotatable multi head scraper unit between predefined angular positions.

16. A roller crusher having two parallel rollers arranged to rotate in opposite directions, and separated by a gap, each roller having two ends, the roller crusher comprising:

a flange attached to one of the ends of one of the rollers, the flange extending in a radial direction of the roller, and the flange having an extension past an envelope surface of the roller, wherein the roller crusher further comprises a scraper device comprising:

a rotatable multi head scraper unit having at least two scrapers arranged tangentially about the rotatable multi head scraper unit at a respective radial distance from a rotational axis of the rotatable multi head scraper unit;

a rotation actuator arranged to selectively rotate the rotatable multi head scraper unit to allow operative use of one of the at least two scrapers at a time; and at least one brake arrangement configured to prevent and/or restrict rotation of the rotatable multi head scraper unit during operation of the one of the at least two scrapers, wherein the rotatable multi head scraper unit is arranged such that one of the at least two scrapers, by the rotation actuator, is selectively positionable at an end of a roller having a flange, and, by the at least one brake arrangement, is prevented and/or restricted to move relative to the roller to thereby at least partially allow removal of material accumulated on the flange and/or on the envelope surface at an end portion of the roller adjacent the flange.

17. The roller crusher according to claim 16, wherein the roller crusher comprises two flanges attached to opposite ends of one of the rollers, and wherein one of the scraper devices is arranged at each ends of the roller with the flanges.

18. A method for operating a roller crusher for grinding granular material, wherein the roller crusher has two parallel rollers arranged to rotate in opposite directions, and separated by a gap, each roller having two ends, the roller crusher comprising:

a flange attached to one of the ends of one of the rollers, the flange extending in a radial direction of the roller, and the flange having an extension past an envelope surface of the roller, wherein the roller crusher further comprises a scraper device comprising:

a rotatable multi head scraper unit having at least two scrapers arranged tangentially about the rotatable multi head scraper unit at a respective radial distance from a rotational axis of the rotatable multi head scraper unit;

a rotation actuator arranged to selectively rotate the rotatable multi head scraper unit to allow operative use of one of the at least two scrapers at a time; and at least one brake arrangement configured to prevent and/or restrict rotation of the rotatable multi head scraper unit during operation of the one of the at least two scrapers, wherein the rotatable multi head scraper unit is arranged such that one of the at least two scrapers, by the rotation actuator, is selectively positionable at an end of a roller having a flange, and, by the at least one brake arrangement, is prevented and/or restricted to move relative to the roller; wherein the method comprises at least the step of:

at least partially removing material accumulated on the flange and/or on the envelope surface at an end portion of the roller adjacent the flange by means of the one of the at least two scrapers.

19. The method according to claim 18, further comprising the step of:

rotating the multi head scraper unit such that the one of the at least two scrapers is exchanged with another one of the at least two scrapers at the end of the roller having a flange.

20. The method according to claim 18, further comprising the step of:

rotating the rotatable multi head scraper unit such that the one of the at least two scrapers is moved from a first operating position to a second operating position, wherein a distance between the one of the at least two scrapers and the envelope surface as defined in an un-worn state of the one of the at least two scrapers is larger at the first operating position than at the second operating position.

21. The method according to claim 19, wherein the scraper device further comprises a drive unit arranged to provide kinetic energy to the rotation actuator for the selective rotation of the rotatable multi head scraper unit, and wherein the method further comprises:

rotating the multi head scraper unit by means of the drive unit.

22. The method according to claim 21, wherein the roller crusher further comprises a sensor system for monitoring the condition of the scraper device; and a controller operatively connected to the sensor system and to the drive unit, and wherein the method further comprises:

the control unit controlling the rotation of the multi head scraper unit based on output data from the sensor system.

* * * * *